US012766412B2

(12) United States Patent
Watanabe

(10) Patent No.: US 12,766,412 B2
(45) Date of Patent: Oct. 20, 2026

(54) PROGRAM, INFORMATION PROCESSING METHOD, AND INFORMATION PROCESSING SYSTEM

(71) Applicant: GREE, Inc., Tokyo (JP)

(72) Inventor: Masashi Watanabe, Tokyo (JP)

(73) Assignee: GREE HOLDINGS, INC., Tokyo (JP)

( * ) Notice: Subject to any disclaimer, the term of this patent is extended or adjusted under 35 U.S.C. 154(b) by 336 days.

(21) Appl. No.: 18/345,742

(22) Filed: Jun. 30, 2023

(65) Prior Publication Data

US 2024/0198227 A1 Jun. 20, 2024

(30) Foreign Application Priority Data

Dec. 19, 2022 (JP) ................................ 2022-202023
Dec. 19, 2022 (JP) ................................ 2022-202024
Dec. 19, 2022 (JP) ................................ 2022-202025
Apr. 18, 2023 (JP) ................................ 2023-067771

(51) Int. Cl.
*A63F 13/537* (2014.01)
*A63F 13/355* (2014.01)
*A63F 13/52* (2014.01)
*A63F 13/818* (2014.01)
*A63F 13/86* (2014.01)
*A63F 13/87* (2014.01)

(52) U.S. Cl.
CPC .......... *A63F 13/537* (2014.09); *A63F 13/355* (2014.09); *A63F 13/52* (2014.09); *A63F 13/86* (2014.09); *A63F 13/87* (2014.09); *A63F 13/818* (2014.09)

(58) Field of Classification Search
CPC ...... A63F 13/537; A63F 13/355; A63F 13/52; A63F 13/86; A63F 13/87; A63F 13/818
See application file for complete search history.

(56) References Cited

U.S. PATENT DOCUMENTS 12,138,543 B1 * 11/2024 Starke ..................... G06T 13/80
2001/0021670 A1 9/2001 Miyamoto et al.
(Continued)

FOREIGN PATENT DOCUMENTS

JP 2005-7059 A 1/2005
JP 2015-054139 A 3/2015
(Continued)

OTHER PUBLICATIONS

Office Action issued Jan. 30, 2024, in corresponding Japanese Patent Application No. 2023-067771 (with English Translation), 12 pages.

(Continued)

*Primary Examiner* — Reginald A Renwick
(74) *Attorney, Agent, or Firm* — Oblon, McClelland, Maier & Neustadt, L.L.P.

(57) ABSTRACT

A program, information processing method, and information processing system for displaying a screen of a game played by a user on a display unit; transmitting data for streaming a video of the game to a stream management server for managing streaming; accepting an operation of the user to view an object acquired in the game; and displaying an object display screen including the object acquired by the user and streaming conditions of the video acquired from the stream management server in response to accepting the operation of the user.

21 Claims, 14 Drawing Sheets

(56) References Cited

U.S. PATENT DOCUMENTS

| | | | | |
|---|---|---|---|---|
| 2014/0235354 | A1* | 8/2014 | Takeuchi | A63F 13/795 709/223 |
| 2025/0174073 | A1* | 5/2025 | Plimmer | G07F 17/3213 |

FOREIGN PATENT DOCUMENTS

| | | | |
|---|---|---|---|
| JP | 2015-150178 | A | 8/2015 |
| JP | 2017-056114 | A | 3/2017 |
| JP | 2019-037614 | A | 3/2019 |
| JP | 2021-078943 | A | 5/2021 |
| JP | 2021-511133 | A | 5/2021 |
| JP | 2021-174283 | A | 11/2021 |

OTHER PUBLICATIONS

Looking back at PlayStation trophies [over 4,500 trophies won], YouTube [online] [video], Oct. 4, 2020, [Retrieved Jan. 25, 2024], <https://www.youtube.com/watch?v=JQ10zNrSxuU>, pp. 1-11.

Office Action dated Jul. 7, 2026, issued in counterpart JP Application No. 2023-099033, citing document No. 1, with English Translation. (5 pages).

Jul. 4, 2020: Happy Oshya PVP Club (7 members) Let's Happy Oshyal, You Tube fonline] [video], Jul. 4, 2020, https://www.youtube.com/watch?v=nON4AdosbVs, [Searched Mar. 23, 2023] (5 pages).

Office Action dated Mar. 28, 2023, issued in counterpart JP Application No. 2022-202023, citing documents No. 1-2, with English Translation. (5 pages).

Office Action dated Apr. 4, 2023, issued in counterpart JP Application No. 2022-202025, citing documents No. 3-5, with English Translation. (8 pages).

Office Action dated Jul. 14, 2026, issued in JP Application No. 2023-111473, citing documents No. 1-2, with English Translation. (8 pages).

* cited by examiner

[FIG. 1]
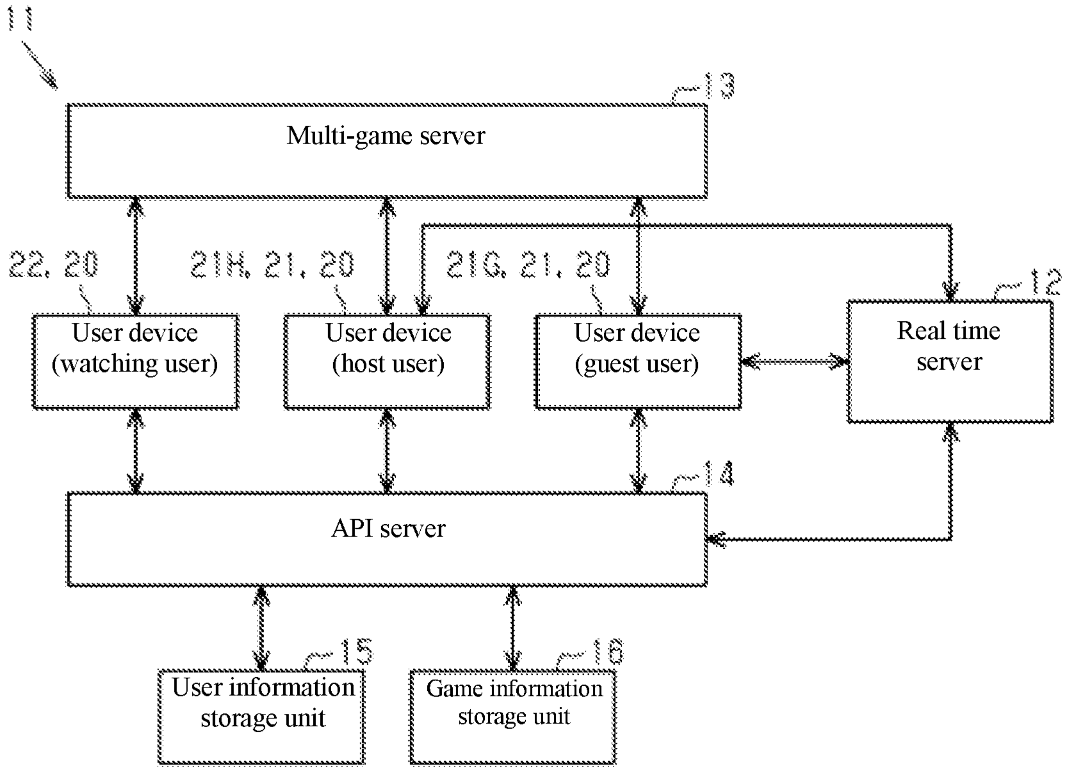
[FIG. 2]
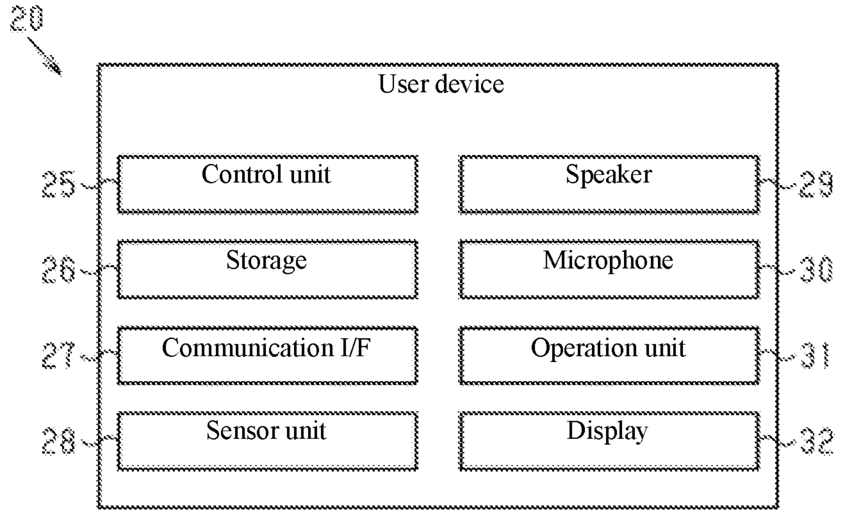

[FIG. 3]
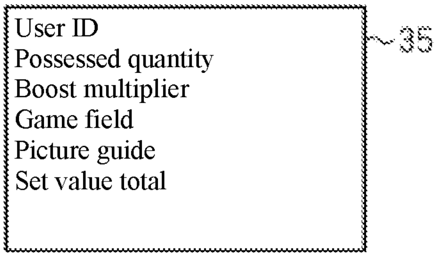
[FIG. 4]
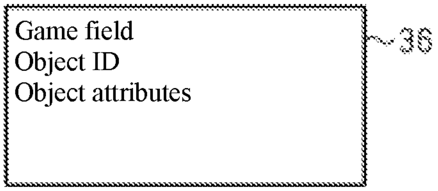
[FIG. 5]
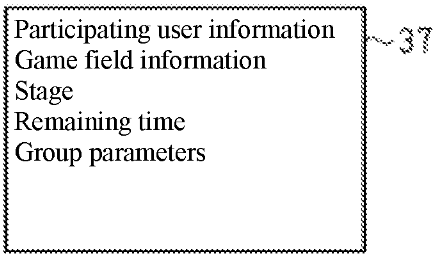

[FIG. 6]
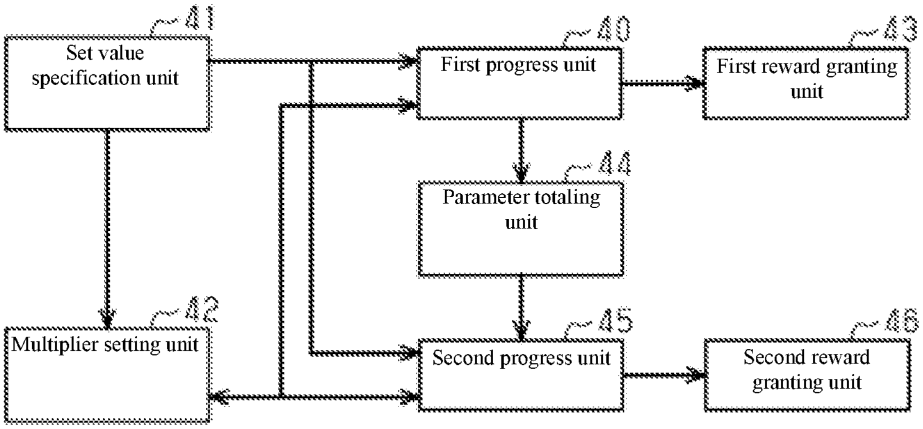
[FIG. 7]
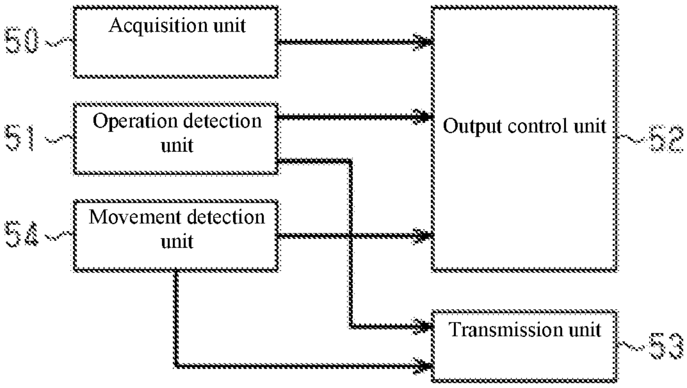

[FIG. 8]
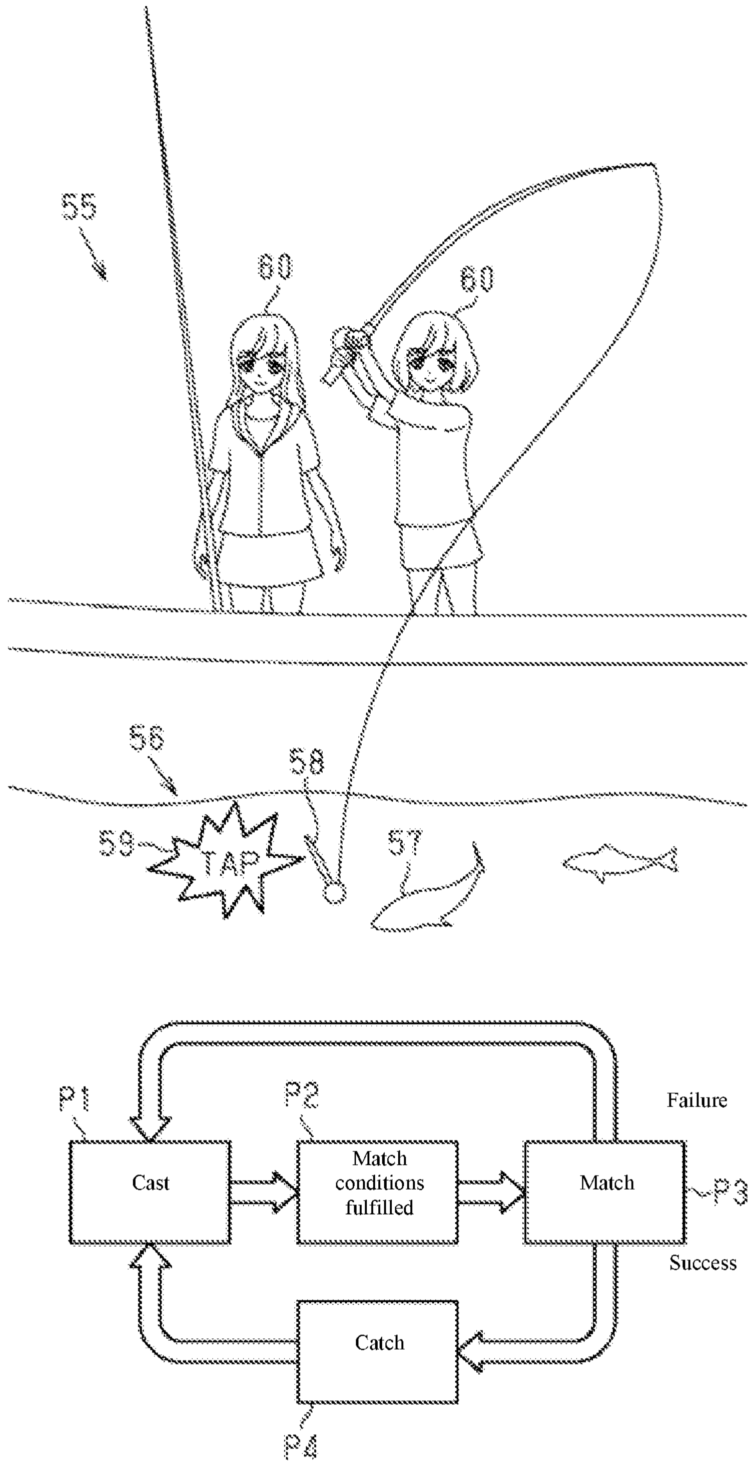

[FIG. 9]
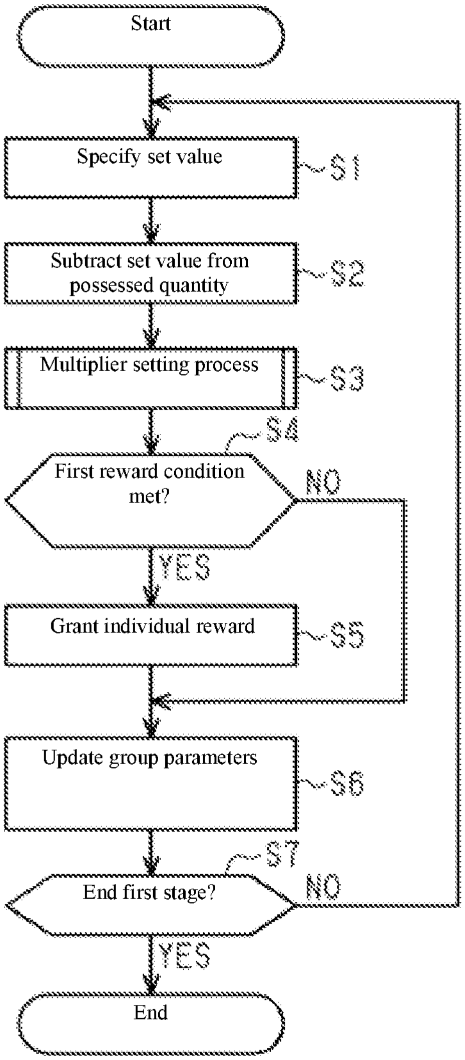

[FIG. 10]
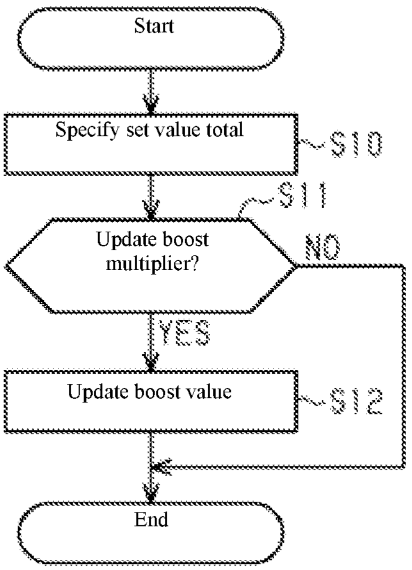
[FIG. 11]
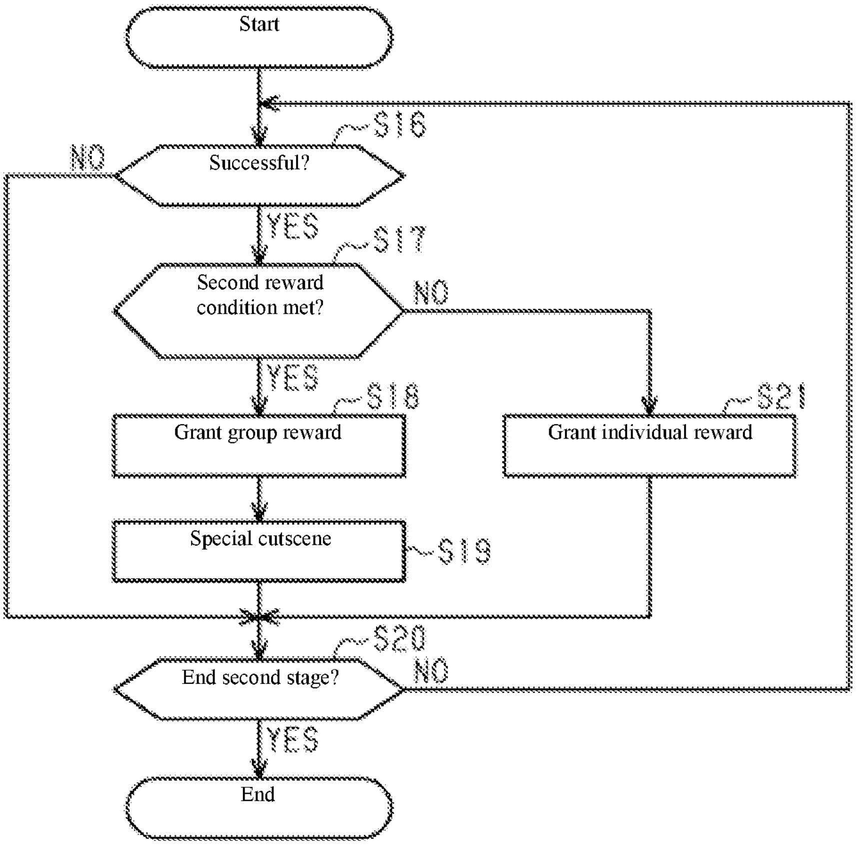

[FIG. 12]
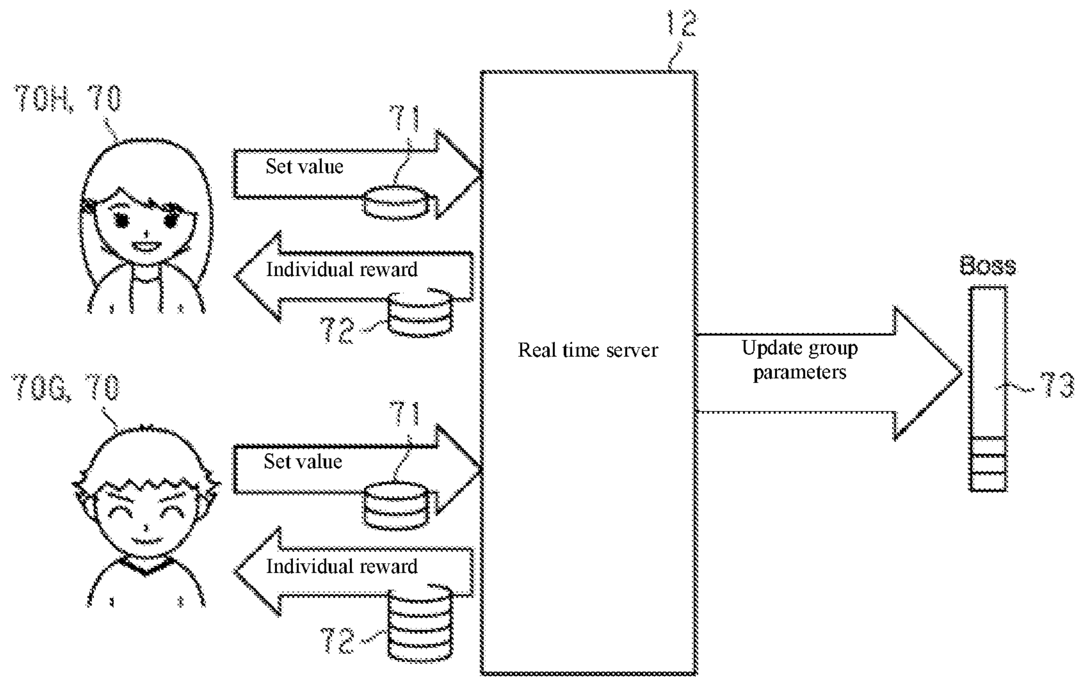
[FIG. 13]
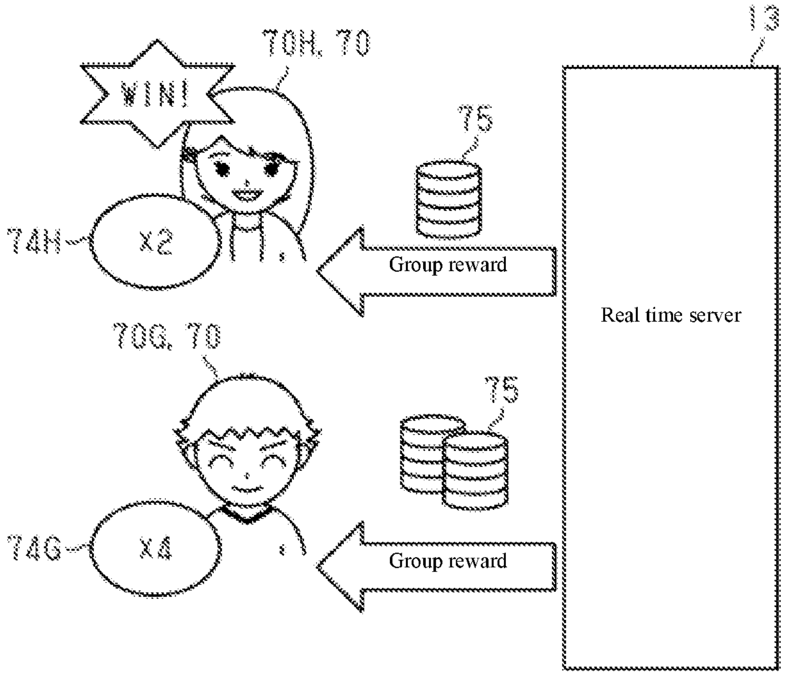

[FIG. 14]
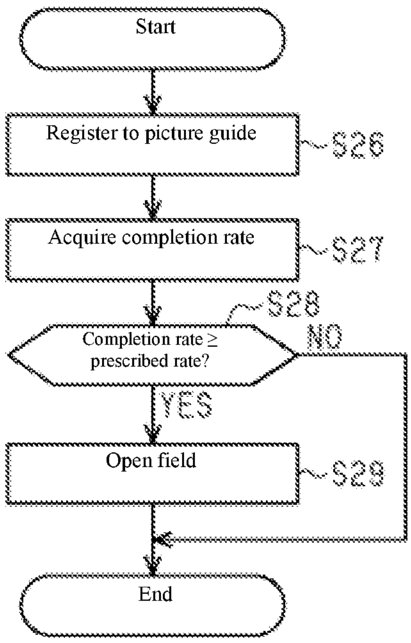

[FIG. 15]
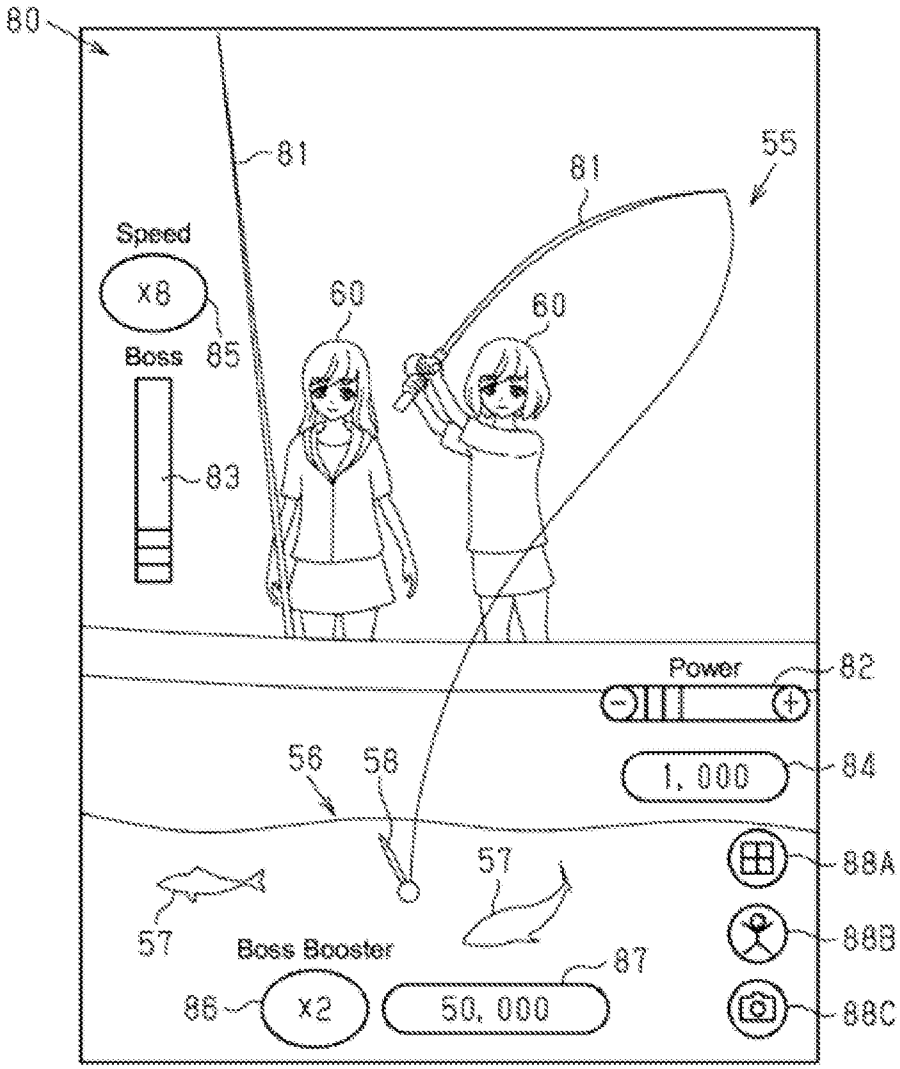

[FIG. 16]
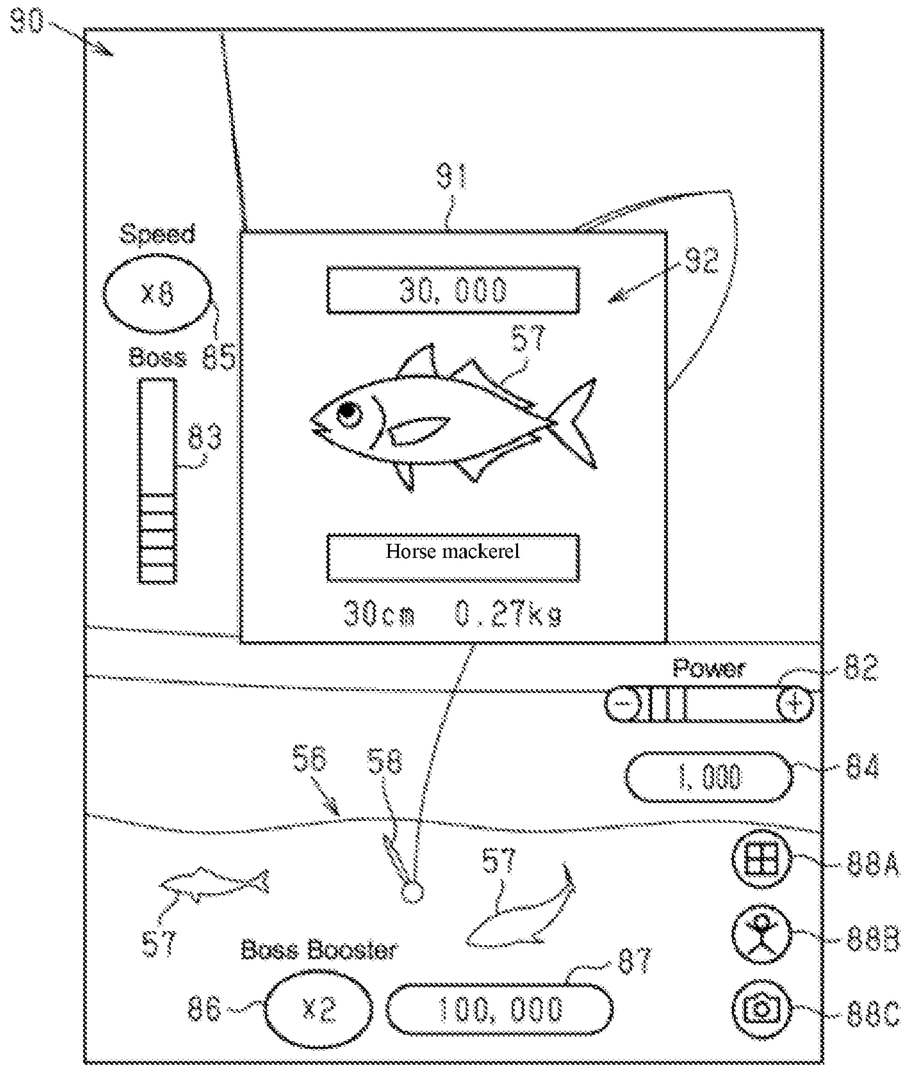

[FIG. 17]
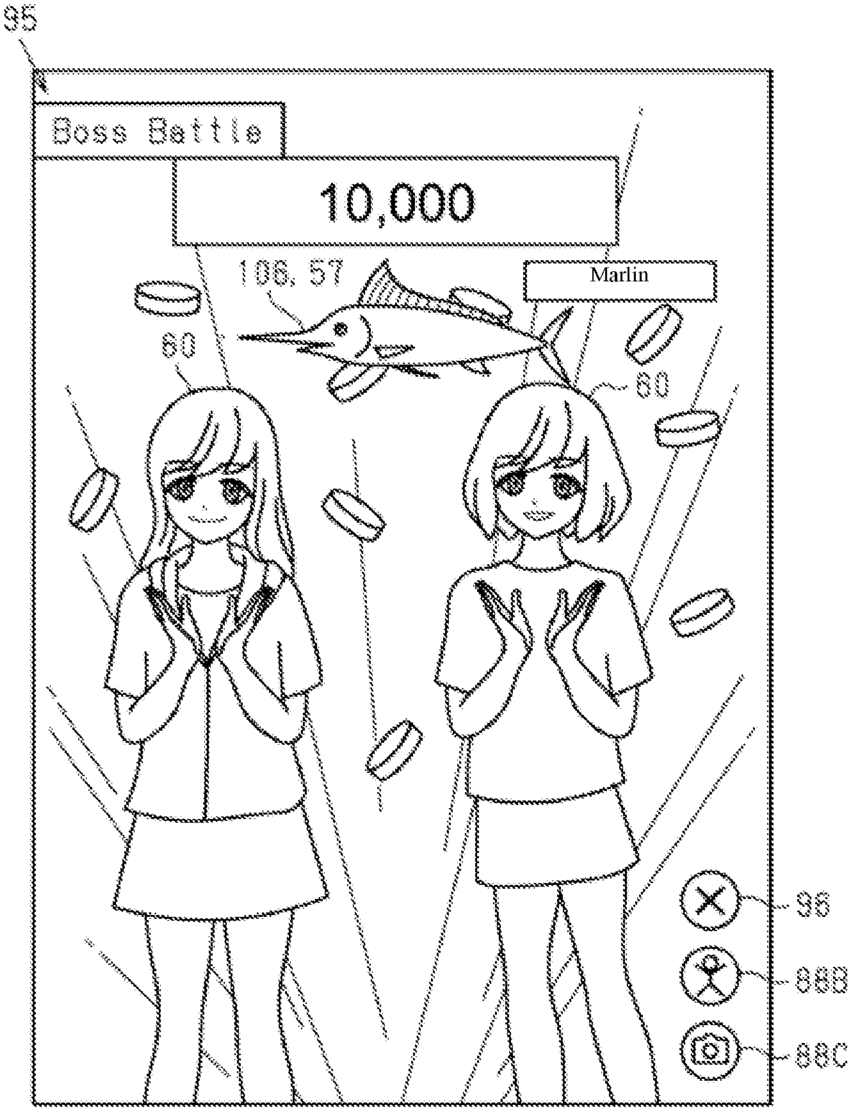

[FIG. 18]
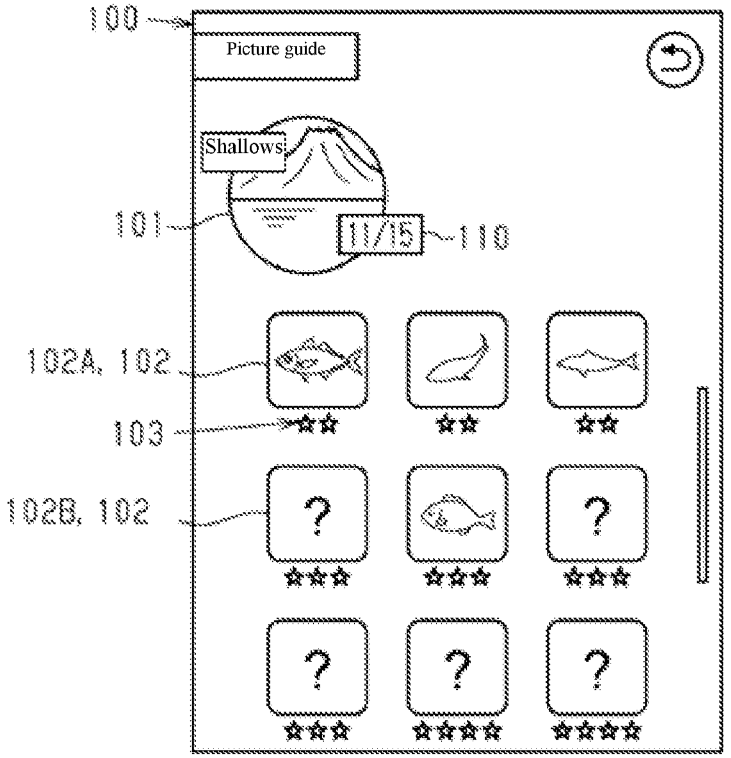
[FIG. 19]
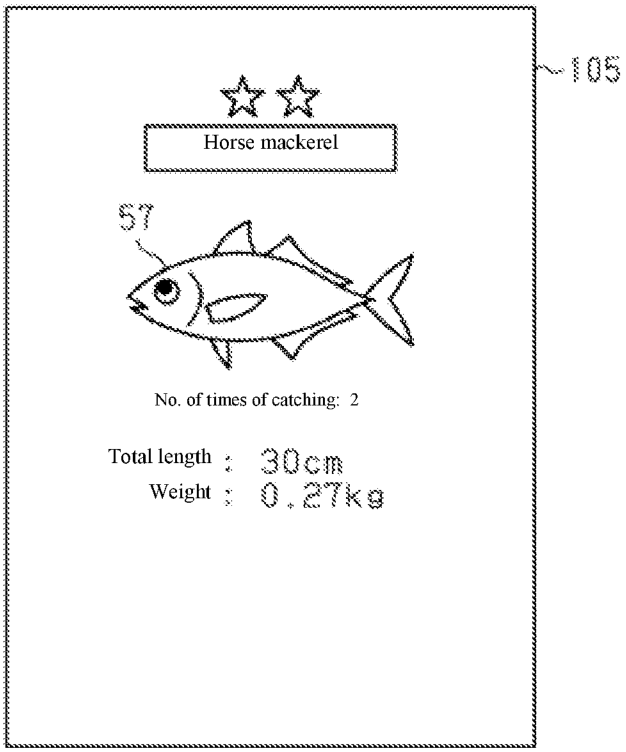

[FIG. 20]
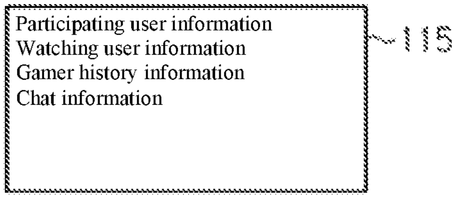
[FIG. 21]
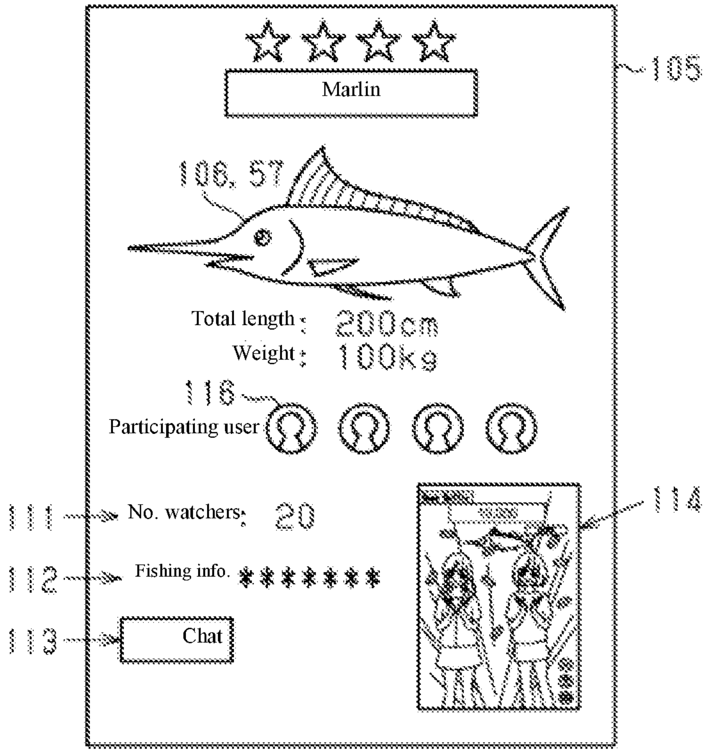
[FIG. 22]
| Level | Set Value | Increase Multiplier |
|---|---|---|
| 1 | 10,000 | X1 |
| 1 | 100,000 | X5 |
| 100 | 10,000 | X0.1 |
| 100 | 100,000 | X1 |
| 100 | 1,000,000 | X5 |

[FIG. 23]
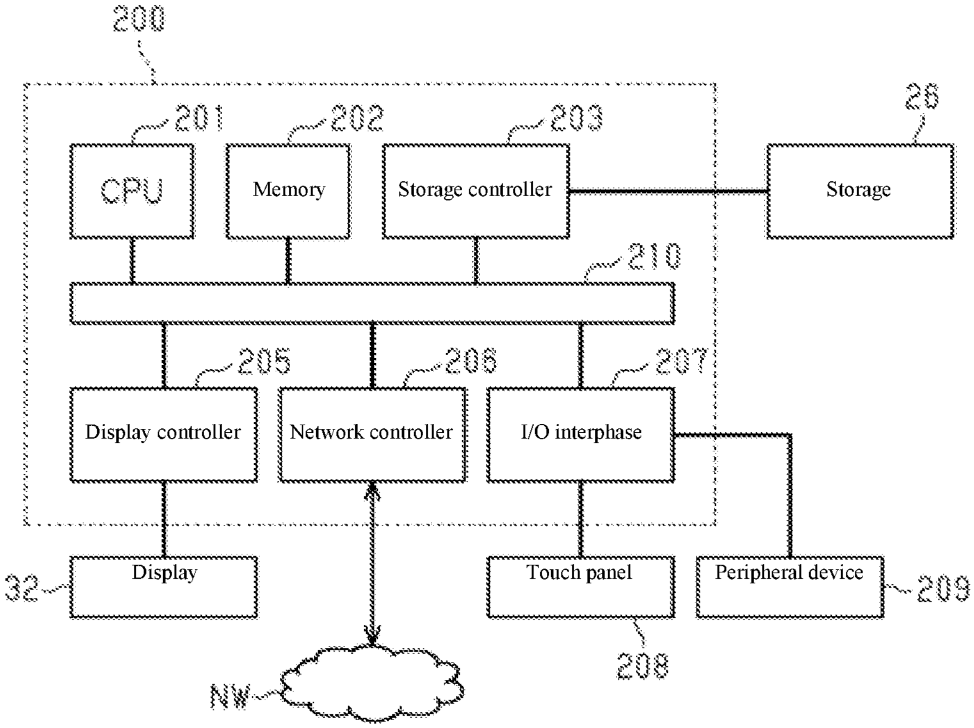

PROGRAM, INFORMATION PROCESSING METHOD, AND INFORMATION PROCESSING SYSTEM

BACKGROUND

Field of the Disclosure

The present disclosure relates to a program, an information processing method, and an information processing system.

Description of the Related Art

A system can, when a player's playing status has met an acquisition condition of an object, register this object and the user in association with each other. In this system, an object (e.g., monster) acquired by the player and information relating to the object can be viewed in a picture guide mode.

However, in the foregoing system, the information relating to the object presented in the picture guide mode is limited to the level of the object and the like, which is not satisfactory for the user.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

A program for solving the foregoing problem causes one or a plurality of computers to function as: a first output control unit for displaying a screen of a game played by a user on a display unit; a first transmission unit for transmitting data for streaming a video of the game to other users to a stream management unit for managing streaming; an operation accepting unit for accepting an operation of the user to view an object acquired in the game; and a second output control unit for displaying an object display screen including the object acquired in the game and streaming conditions of the video acquired from the stream management unit when an operation of the user is accepted.

According to the present disclosure, it is possible to increase user satisfaction with a list of objects acquired by the user.

In one embodiment, the present disclosure is related to a non-transitory computer-readable storage medium for storing a program including computer-readable instructions that, when executed by one or a plurality of computers, cause the one or the plurality of computers to perform a method, the method comprising: displaying a screen of a game played by a user on a display unit; transmitting data for streaming a video of the game to a stream management server for managing streaming; accepting an operation of the user to view an object acquired in the game; and displaying an object display screen including the object acquired by the user and streaming conditions of the video acquired from the stream management server when the operation of the user is accepted.

In one embodiment, the present disclosure is related to an information processing method, the method comprising: displaying, via first output control processing circuitry, a screen of a game played by a user on a display unit; transmitting, via first transmission processing circuitry, data for streaming a video of the game to a stream management server for managing streaming; accepting, via operation accepting processing circuitry, an operation of the user to view an object acquired in the game; and displaying, via second output control processing circuitry, an object display screen including the object acquired by the user and streaming conditions of the video acquired from the stream management server when the operation of the user is accepted.

In one embodiment, the present disclosure is related to an information processing system comprising: a user device, a stream management server configured to manage streaming of video, and a game management server configured to manage progress of a game, wherein the user device is provided with: first output control processing circuitry configured to display a screen of the game played by a user on a display unit, first transmission processing circuitry configured to transmit data for streaming a video of the game to the stream management server, operation accepting processing circuitry configured to accept an operation of the user to view an object acquired in the game, and second output processing circuitry configured to display an object display screen including the object acquired in the game and streaming conditions of the video acquired from the stream management server when the operation of the user is accepted, the stream management server is configured to transmit data for streaming the video to watching user devices and record streaming conditions of the video, and the game management server is configured to determine whether a playing status of the user for the game meets an acquisition condition for the object and record the object and the user in association with each other when the acquisition condition is met.

In one embodiment, the present disclosure is related to an information processing apparatus comprising first output control processing circuitry configured to display a screen of the game played by a user on a display unit, first transmission processing circuitry configured to transmit data for streaming a video of the game to a stream management server, operation accepting processing circuitry configured to accept an operation of the user to view an object acquired in the game, and second output processing circuitry configured to display an object display screen including the object acquired in the game and streaming conditions of the video acquired from the stream management server in response to accepting the operation of the user.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a schematic diagram illustrating one embodiment of the information processing system in a first embodiment of the present disclosure;

FIG. 2 is a schematic diagram illustrating a configuration of a user device in one embodiment of the present disclosure;

FIG. 3 is a diagram schematically illustrating user information of one embodiment of the present disclosure;

FIG. 4 is a diagram schematically illustrating game environment information of one embodiment of the present disclosure;

FIG. 5 is a diagram schematically illustrating game management information of one embodiment of the present disclosure;

FIG. 6 is a diagram describing functions of a real-time server of one embodiment of the present disclosure;

FIG. 7 is a diagram describing functions of the user device of one embodiment of the present disclosure;

FIG. 8 is a diagram describing a specific example of a game of one embodiment of the present disclosure;

FIG. 9 is a flowchart illustrating a processing procedure of the server of one embodiment of the present disclosure;

FIG. 10 is a flowchart illustrating a processing procedure of the server of one embodiment of the present disclosure;

FIG. 11 is a flowchart illustrating a processing procedure of the server of one embodiment of the present disclosure;

FIG. 12 is a diagram describing a game parameter and change in the game parameter in one embodiment of the present disclosure;

FIG. 13 is a diagram describing change in the game parameter in one embodiment of the present disclosure;

FIG. 14 is a flowchart illustrating a processing procedure of the server of one embodiment of the present disclosure;

FIG. 15 is a diagram illustrating one example of a game screen of one embodiment of the present disclosure;

FIG. 16 is a diagram illustrating one example of a game screen of one embodiment of the present disclosure;

FIG. 17 is a diagram illustrating one example of a game screen of one embodiment of the present disclosure;

FIG. 18 is a diagram illustrating one example of a game screen of one embodiment of the present disclosure;

FIG. 19 is a diagram illustrating one example of a game screen of one embodiment of the present disclosure;

FIG. 20 is a diagram illustrating streaming history information in one embodiment of the present disclosure;

FIG. 21 is a diagram illustrating one example of a game screen of one embodiment of the present disclosure;

FIG. 22 is a diagram schematically illustrating multiplier information in one embodiment of the present disclosure; and FIG. 23 is a diagram illustrating one example of a hardware configuration of control circuitry provided to the user device, according to one embodiment of the present disclosure.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

First Embodiment

A first embodiment of the program, the information processing method, and the information processing system will be described below.

<Information Processing System>

An information processing system 11 will described with reference to FIG. 1. In the present embodiment, the information processing system 11 is a system for running a game (e.g., a multiplayer game) in which a plurality of users participate online and for streaming and watching videos of the game.

The information processing system 11 is provided with a real-time server 12, a multi-game server 13, an API server 14, and a user device 20. Each server 12 to 14 and the user device 20 transmit and receive data via a network such as the Internet (not illustrated). Furthermore, the information processing system 11 is provided with a user information storage unit 15 and a game information storage unit 16. In the present embodiment, the real-time server corresponds to a game management unit (game management server) and a game control device, and the multi-game server 13 corresponds to the stream management unit (stream management server). Furthermore, the API server 14 corresponds to a user information management unit (user information management server). In some embodiments, the units (e.g., the game management unit, the stream management unit, the user information management unit) may be combined in a shared server or shared processing circuitry, or may be distributed across more than one server. For instance, the game management unit (game management server) and the stream management unit (stream management server) may be a single server configured for game management and stream management.

A user who streams a video using the user device 20 is referred to as a streaming user, and a user who watches the streamed video is referred to as a watching user. A user may be both a streaming user and a watching user. In other words, a user is a watching user when they watch a video and a streaming user when they stream a video. Furthermore, a user device 20 used by a streaming user is referred to as a streaming user device 21, and a user device 20 used by a watching user is referred to as a watching user device 22. In the present embodiment, descriptions that do not distinguish between streaming users and watching users simply refer to these as "users." Furthermore, descriptions that do not distinguish between streaming user devices 21 and watching user devices 22 simply refer to these as user devices 20.

Moreover, the streaming user device 21 may stream a video of a game in which a plurality of streaming users participate. Hereinafter, a streaming user who creates a room to start a game is referred to as a host user, and a streaming user who joins a room created by the host user is referred to as a guest user. Furthermore, a group is formed when a host user and a guest user join a room. Moreover, in the present embodiment, for convenience of description, a streaming user device 21 used by a host user is referred to as a host user device 21H, a streaming user device 21 used by a guest user is referred to as a guest user device 21G, and when not distinguishing between these, they are simply referred to as streaming user devices 21.

The real-time server 12 transmits and receives data for running a game to and from the host user device 21H and the guest user device 21G. The real-time server 12 receives game progress data from the host user device 21H and the guest user device 21G. The real-time server 12 transmits game control data to the host user device 21H and the guest user device 21G.

The multi-game server 13 connects to the watching user device 22 and the streaming user device 21. The multi-game server 13 handles relaying of data relating to streaming of video. The multi-game server 13 receives various data necessary for rendering a game video from the streaming user device 21. The multi-game server 13 also transmits various received data to other streaming user devices 21 and watching user devices 22. For example, when the multi-game server 13 receives data for rendering a video from the host user device 21H, it transmits the data for rendering the video or data processed from said data to the guest user device 21G and the watching user device 22. The multi-game server 13 transmits and receives data relating to the game video to and from the real-time server 12.

The API server 14 acquires and updates information at a relatively low update frequency in response to requests from the real-time server 12 and the like. Specifically, the API server 14 acquires and updates user information stored in the user information storage unit 15. The API server 14 also acquires and updates game management information stored in the game information storage unit 16.

A hardware configuration of the user device 20 will be described with reference to FIG. 2. The user device 20 is a smartphone (multi-functional telephone device), tablet device, personal computer, console game machine, wearable computer, or an information processing device other than these devices that is capable of playing video. The wearable computer may be provided with a screen on which the user can watch video. For example, it is a head-mounted display worn on the user's head, a glasses-type wearable device, or the like. The user device 20 is a device that operates independently or is configured from a plurality of devices connected such that various data can be transmitted and received therebetween. One example of the latter user device 20 is a system for performing outside-in tracking.

The user device 20 is provided with a control unit 25, a storage 26 (storage medium), and a communication interface (I/F) 27. The control unit 25 is provided with one or a plurality of processing circuits. Processing circuits include CPUs (central processing units), GPUs (graphic processing units), NPUs (neural network processing units), and the like, or a combination thereof. The control unit 25 is also provided with a memory, which is a main storage device (storage medium) capable of being read and written to by arithmetic circuitry. The memory is configured from semiconductor memory and the like. The control unit 25 loads operating systems and other programs from the storage 26 or external storage into the memory. The control unit 25 also executes commands retrieved from the memory. The communication I/F 27 can transmit and receive data to and from each server 12 to 14 via a network (not illustrated). The network includes various networks, such as local area networks or the Internet.

The storage 26 is an auxiliary storage device (storage medium), for example, a storage medium such as a magnetic disk, an optical disk, or a semiconductor memory. The storage 26 may also use a plurality of storages in combination.

The control unit 25 runs each process relating to video streaming and each process relating to watching by running various programs recorded in the storage 26 based on an input operation performed by the user on an operation unit 31. Hereinafter, for convenience of explanation, the state in which video streaming is performed is referred to as a streaming mode, and the state of watching a video streamed by another streaming user is referred to as a watching mode.

The user device 20 is also provided with a sensor unit 28, a speaker 29, a microphone 30, the operation unit 31, and a display 32. At least one of the sensor unit 28, the speaker 29, the microphone 30, the operation unit 31, and the display 32 is provided in the same device as the control unit 25 or in a manner connected to a device provided with the control unit 25.

The sensor unit 28 is one or a plurality of sensors that detect a face motion indicating a change in the facial expression of the user and a body motion indicating a change in relative position of the user's body to the sensor unit 28. The face motion includes movements such as blinking and opening and closing the mouth. A well-known sensor unit may be used as the sensor unit 28. One example of the sensor unit 28 includes a Time of Flight (ToF) sensor for measuring a time of flight until light irradiated toward the user is reflected back to the user's face or the like, a camera for photographing the user's face, and an image processing unit for image processing data photographed by the camera. The sensor unit 28 may also include an RGB camera for imaging visible light and a near-infrared camera for imaging near-infrared light. For example, "LIDAR" (light detection and ranging or laser imaging detection and ranging) such as TrueDepth (TrueDepth) or another ToF sensor installed in a smartphone may be used as the RGB camera or near-infrared light camera. This camera specifically projects tens of thousands of invisible dots (dots) onto the user's face and other areas via a dot projector. Reflected light of the dot pattern is then detected and analyzed to form a depth map of the face, and infrared images of the face and the like are captured to capture accurate facial data. An arithmetic processing unit of the sensor unit 28 generates various information based on the depth map and infrared image and compares this information with registered reference data to calculate a depth (distance between each point and the near-infrared camera) and positional deviations other than depth of each point on the face. The sensor unit 28 transmits face motions and body motions to an output control unit 52 as tracking data. Note that tracking data is one example of motion data. Motion data is data used to make an avatar object move.

The sensor unit 28 may also have a function to track not only the user's face but also the user's hands (hand tracking). The sensor unit 28 may also include a sensor for detecting a position or incline of a human part other than the hands. The sensor unit 28 may further include a sensor for detecting velocity or acceleration, such as an accelerometer, a sensor for detecting direction and orientation, such as a gyroscope (gyro) sensor, and the like. The sensor unit 28 may have a spatial mapping function for recognizing objects in a real space where the user is located based on detection results of the foregoing ToF sensors or other sensors and mapping the recognized objects onto a spatial map.

The speaker 29 converts audio data into audio and outputs it. The microphone 30 inputs audio spoken by the user and converts it into audio data. The display 32 outputs various images in response to an output instruction from the control unit 25.

The operation unit 31 used may be according to the type of the user device 20. One example of the operation unit 31 is a touch panel integrated with the display 32. Furthermore, another example of the operation unit 31 is a controller or the like that the user can operate by hand, such as an operation button, keyboard, or mouse, provided within a housing or the like of the user device 20. The controller may incorporate various well-known sensors, such as an inertial measurement sensor (IMU: inertial measurement unit), for example, accelerometers or a gyro. Furthermore, one other example of the operation unit 31 may be a tracking device that identifies hand movements, eye movements, head movements, direction of sight, and the like of the user. In this aspect, for example, it is possible to determine an instruction of the user based on the hand movements of the user and execute various operations such as starting or stopping streaming of a video, rating a message or video, or displaying a prescribed object. Note that when the sensor unit 28 also has an input interface function such as a hand tracking function, the operation unit 31 may be omitted.

The hardware configuration of each server 12 to 14 will be described. The servers 12 to 14 are used by service providers who provide services for the user to stream and watch videos, and the like. The servers 12 to 14 are provided with the control unit 25, the storage 26, and the communication I/F 27. These configurations are similar to that of the user device 20. A program for controlling the game is stored in the storage 26 of the real-time server 12. Furthermore, a management program relating to streaming is recorded in the storage 26 of the multi-game server 13.

<Configuration of Data Used in Game>

Next, each set of data used to run the game and stream video will be described in detail with reference to FIG. 3 to FIG. 5.

FIG. 3 illustrates one example of user information 35. The user information 35 is recorded in the user information storage unit 15. The user information 35 is information generated for each user and includes a user ID (identifier) acting as a user identifier, a possessed quantity, a boost multiplier, a game field, a picture guide, and a set value total. The possessed quantity is the value of a game parameter associated with the user. The game parameter is a parameter used in the game and associated with the user. For example, parameters include attack power, defense power, combat power, physical strength (hit points, stamina), magical power (magic points), level, experience, number of skill points, which are points consumed when using skills, agility, number of medals, number of points, number of coins, and the like. Furthermore, the game parameter can also be referred to as a number or amount of a game medium associated with the user. The game media may be any electronic data used in the game. The electronic data may be acquired, owned, used, managed, exchanged, synthesized, enhanced, sold, disposed of, gifted, otherwise handled in the game by the user. For example, the game media may include any media, such as cards, items, virtual currency (medals or coins), tickets, characters, and avatars. Modes of use of the game media are not limited to those explicitly stated in the present disclosure.

The boost multiplier is a multiplier for increasing a group reward granted to the user. The group reward is a reward granted to all users belonging to a group when a prescribed reward condition (second reward condition) is met. The game field indicates a game field that can be played by the user, from among a plurality of game fields. The boost multiplier is recorded in association with the game field. In the present embodiment, the boost multiplier changes to an initial value when the game ends. Furthermore, when the game is interrupted, the boost multiplier at the time of interruption is recorded.

The picture guide is a list (list) of moving objects acquired by the user in the game. The set value total is a value totaling the set values of a game parameter set by the user in the game. In the present embodiment, the set value is a number of medals (bet amount) wagered by the user in the game. The user may wager the number of medals multiple times. The set value total is the total number of medals wagered by the user.

FIG. 4 illustrates one example of game environment information 36. The game environment information 36 is master data and is recorded in the game information storage unit 16. The game environment information 36 includes game fields, object IDs (identifiers), and object attributes. In one of the games run during video streaming, a game field can be selected. Game field indicates a plurality of game fields that can be implemented in the game.

The game field has moving objects defined that appear in that game field. An object ID is an identifier of a moving object and is associated with the game field. An object attribute is attribute information of the moving object. For example, object attributes include rarity (rarity), total length, and weight. Object attributes also include odds (multipliers). The greater the odds (for example, 2×, 3×, or the like), the higher the difficulty of acquiring that moving object. In the present embodiment, the odds are set to a multiplier of 1× or more or a multiplier of less than 1× according to the type of moving object. Difficulty is predetermined by other object attributes, such as rarity, total length, or weight. The object attributes may also include at least one from among attributes such as "fire attribute" or "water attribute," attack power, defense power, combat power, physical strength (hit points, stamina), magical power (magic points), level, experience, skill points, which are points consumed when using skills, agility, and the like.

FIG. 5 illustrates one example of game management information 37. The game management information 37 is information generated for each room. The game management information 37 is recorded in the storage 26 of the real-time server 12 and in the game information storage unit 16.

The game management information 37 includes participating user information, game field information, stages, remaining time, and group parameters. The participating user information identifies the host user and the guest user. For example, the participating user information includes the user ID of the host user and the user ID of the guest user. The game field information indicates a game field selected by the host user among the game fields associated with the host user.

The stage in the game management information 37 indicates a stage being played by the streaming users. In the present embodiment, the game includes multiple stages. A stage is a constituent unit dividing the game into multiple parts. The present embodiment includes a first stage and a second stage. When a mission of one stage is accomplished, the game proceeds to the next stage. Multiple parts are included in each stage. A part is a battle with one moving object. Each part ends once a winner is determined. Furthermore, a shared parameter is used for multiple stages. Shared parameters between the stages are the boost multiplier and the possessed number of medals. In other words, the possessed number of medals in the first stage can be carried over to the second stage. Users can also use the same item across multiple stages.

The remaining time indicates a remaining time in the game. When the game in the second stage is being run, the remaining time of the second stage is recorded in the game management information 37.

The group parameter is a parameter increased (or decreased) by collaboration between each user participating in the game. The group parameter increases based on a game playing status of the game from each streaming user participating in the game. In the present embodiment, the group parameter is different from the game parameter, but it may be the same as the game parameter. Group parameters may be, for example, attack power, defense power, combat power, physical strength, and the like. The group parameter may be the number of medals, the number of points, or the number or amount of game media. The stage, remaining time, and group parameter change as the game progresses.

<Server Functions>

Each function of the real-time server 12 will be described with reference to FIG. 6. By running programs stored in the storage 26, the control unit 25 of the real-time server 12 functions as a first progress unit 40, a set value specification unit 41, a multiplier setting unit 42, a first reward granting unit 43, a determination unit 44, a second progress unit 45, and a second reward granting unit 46. The second progress unit 45 corresponds to a game progress unit and a determination unit.

Each function of a server (e.g., the real-time server 12, the multi-game server 13), as presented herein, may be executed by a control unit 25 running programs or computer-readable instructions. In some embodiments, a unit (e.g., the first progress unit 40, the set value specification unit 41) can refer to processing circuitry configured to execute the methods attributed to the unit. For example, the first progress unit 40 can refer to first progress processing circuitry. The control unit 25 may include processing circuitry as is described with reference to FIG. 23. In general, the control unit 25 includes processing circuitry configured to execute the methods attributed to units described herein, including, but not limited to the first progress unit 40, the set value specification unit 41, the multiplier setting unit 42, the first reward granting unit 43, the determination unit 44, the second progress unit 45, the second reward granting unit 46, etc. In some embodiments, the processing circuitry of the control unit 25 can be shared by each of the units. For example, the set value specification unit 41 can include set value specification processing circuitry and the multiplier setting unit 42 can include multiplier setting processing circuitry. The set value specification processing circuitry and the multiplier setting processing circuitry can be shared processing circuitry of the control unit 25.

In the first stage of the game, the first progress unit 40 progresses the game based on game progress data received from the streaming user device 21 of each streaming user belonging to the group. Furthermore, when a streaming user performs a prescribed operation associated with a set value in the first stage, the first progress unit 40 decreases the set value specified by the set value specification unit 41 from the possessed quantity in the user information 35. The first progress unit 40 also updates the group parameter associated with the group when a streaming user updates the possessed quantity using the set value.

Furthermore, the first progress unit 40 increases the value of the group parameter associated with the group when a first action execution request is accepted from the streaming user device 21. Also, when it is determined that a second in-game action by a streaming user is successful, the first progress unit 40 associates the moving object with the streaming user.

The first progress unit 40 also determines whether the playing status of the game meets the acquisition condition for the moving object. When the acquisition condition is met, said moving object is associated with the streaming user and recorded in the user information storage unit 15 via the API server 14.

The set value specification unit 41 specifies, as a set value, the value of a game parameter set by the streaming user.

When the playing status of a streaming user meets a first reward condition in the first stage, the first reward granting unit 43 specifies the value of a game parameter according to a set value to be granted as an individual reward. The possessed quantity, which is the value of the game parameter associated with said streaming user, is also changed based on the individual reward.

The multiplier setting unit 42 increases the boost multiplier associated with each streaming user according to the set value specified by the set value specification unit 41. The second reward granting unit 46 increases a group reward respectively granted to each streaming user according to the boost multiplier.

The determination unit 44 determines whether a mission of the group has been accomplished based on the playing status of each user in the first stage. In the present embodiment, the determination unit 44 determines that the mission of the group has been accomplished when the value of the group parameter reaches a prescribed value.

When the mission of the group has been accomplished, the second progress unit 45 progresses the game to the second stage based on the game progress data received from the streaming user devices 21. Furthermore, when it is determined that a second in-game action is successful, the second progress unit 45 associates the moving object with the streaming user.

The second progress unit 45 also decreases a group parameter according to time and ends the second stage when the group parameter reaches a lower limit. The rate of decrease of the group parameter may be constant, or it may increase or decrease over time.

In the second stage, when one streaming user belonging to the group meets a second reward condition, the second reward granting unit 46 specifies at least one of all of the streaming users belonging to the group as a user to be granted the group reward. In the present embodiment, the users to whom the group reward is granted are streaming users 70 belonging to the group. Furthermore, the value of a game parameter to be granted as the group reward is specified for each user to be granted the group reward. Also, the possessed quantity of each user to be granted the group reward is then updated based on the group reward. Specifically, the value of the game parameter is added to each possessed quantity as the group reward. In the present embodiment, the possessed quantity returns to the initial value when the game ends.

In the present embodiment, the second reward granting unit 46 grants the group reward to the streaming users according to the boost multiplier associated with each streaming user. When the second reward condition relating to the moving object is met, the second reward granting unit 46 determines the group reward according to the boost multiplier and the value of a parameter associated with the moving object.

<User Device Functions>

Each function of the user device 20 will be described with reference to FIG. 7. The control unit 25 of the user device 20 runs a video application to function as an acquisition unit 50, an operation detection unit 51, a movement detection unit 54, an output control unit 52, and a transmission unit 53. In some embodiments, a unit (e.g., the acquisition unit 50, the operation detection unit 51, etc.) can refer to processing circuitry configured to execute the methods attributed to the unit. For example, the acquisition unit 50 can refer to acquisition processing circuitry. The control unit 25 may include processing circuitry as is described with reference to FIG. 23. In general, the control unit 25 includes processing circuitry configured to execute the methods attributed to units described herein, including, but not limited to, the acquisition unit 50, the operation detection unit 51, the movement detection unit 54, the output control unit 52, and the transmission unit 53, etc. In some embodiments, the processing circuitry of the control unit 25 can be shared by each of the units. For example, the acquisition unit 50 can refer to acquisition processing circuitry and the operation detection unit 51 can refer to operation detection processing circuitry. The acquisition processing circuitry and the operation detection processing circuitry can be shared processing circuitry of the control unit 25.

The output control unit 52 corresponds to a first output control unit, a second output control unit, a first reward display unit, and a second reward display unit. Furthermore, the operation detection unit 51 corresponds to an operation accepting unit, and the transmission unit corresponds to a first transmission unit and a second transmission unit.

The acquisition unit 50 acquires various data, such as display control data transmitted from other user devices 20 via the multi-game server 13 and game control data transmitted from the real-time server 12.

The game control data that the acquisition unit 50 receives from the real-time server 12 includes at least one of data representing in-game actions of other streaming users, data representing the group parameter, data representing an individual reward, data representing a group reward, and data relating to objects in the game field. The game control data changes depending on the content of the game. Furthermore, display control data that the acquisition unit 50 acquires from the multi-game server 13 is data for watching videos of the game streamed by other users who are streaming users. The display control data includes motion data associated with the other streaming users. The data included in the display control data depends on the video streaming method. The acquisition unit 50 also acquires audio data of the streaming users from the multi-game server 13.

The operation detection unit 51 detects input operations performed by the user on the operation unit 31. For example, the operation detection unit 51 accepts user operations. User operations include an operation for transmitting a request to display a gift object (gift display request), an operation for posting a message on a video, an operation for rating a video (selecting a "Like" button or "Favorite" button, or the like).

Furthermore, the operation detection unit 51 accepts an operation of the user to view a moving object acquired in the game.

When the progress of the game meets a photographing condition, the movement detection unit 54 acquires tracking data detected from the movements of the streaming user from the sensor unit 28, such as facial expressions and upper body movements. The tracking data is included in the motion data used to make the avatar object move.

The output control unit 52 displays the game screen based on operations of the streaming users belonging to the group. The game screen changes continuously as the game progresses. This game screen data in video form is transmitted to the watching user device 22. Furthermore, when the playing status of a streaming user meets the first reward condition in the first stage, the output control unit 52 displays, as the possessed quantity reflecting the individual reward, the possessed quantity updated using the value of the game parameter according to the set value.

Moreover, when the mission of the group is accomplished, the output control unit 52 displays the game screen of the second stage. When a streaming user belonging to the group meets the second reward condition in the second stage, the users' possessed quantities updated using the value of the game parameter acting as the group reward are displayed.

The output control unit 52 also displays an object display screen including the moving object acquired in the game and streaming conditions of the video acquired from the multi-game server 13.

The transmission unit 53 transmits the game progress data to the real-time server 12 and the like. The game progress data may include game start requests, set values set by streaming users, in-game action execution requests, cutscene end requests, photographing requests, and the like. The transmission unit 53 also transmits display control data including motion data acquired by the movement detection unit 54 to the multi-game server 13 as data for streaming a video of the game to other users.

<Video Streaming Method>

Next, video streaming methods will be described. One from among a client rendering method, a browser rendering method, a cinematic streaming method, and a server streaming method may be used as the streaming method of the video.

In the client rendering method, each user device 20 receives the data necessary for rendering from the multi-game server 13 and displays the video. Motion data is included in the data received from the multi-game server 13. Video rendering is performed by each user device 20. In addition, each user device 20 acquires audio data based on streaming user speech and outputs the audio in synchronization with the video. In this case, the storage 26 of each user device 20 records the video application (program) and various data such as model data for rendering avatar objects.

The browser rendering method is a method in which the streaming user device 21 and the watching user device 22 display the video using a web browser program stored in the storage 26. At this time, the streaming user device 21 transmits display control data including motion data and the like to the multi-game server 13. The user device 20 that displays the video downloads from the multi-game server 13 a web page written in a markup language such as HTML (Hyper Text Markup Language) and using CSS (Cascading Style Sheets), JavaScript®, or the like. The web browser program called by the user device 20 renders avatar objects and other objects via JavaScript running in the browser. In this method, the user device 20 records in the storage 26 data such as the URL of a web page for displaying the video. In other words, avatar object model data and the like are not stored in the user device 20.

The cinematic streaming method is a method in which the streaming user device 21 generates video data. Specifically, the streaming user device 21 generates video data using motion data and the like detected by the movement detection unit 54. Furthermore, the streaming user device 21 transmits encoded video data and audio data to the multi-game server 13. The multi-game server 13 transmits the video data and audio data to the watching user device 22. The watching user device 22 displays a video on the display 32 based on the video data received from the streaming user device 21.

The server streaming method is a method in which the multi-game server 13 generates video data. The multi-game server 13 receives motion data and audio data from the streaming user device 21. The multi-game server 13 then generates video data based on these sets of data. The multi-game server 13 transmits the generated video data to the streaming user device 21 and the watching user device 22. The streaming user device 21 and the watching user device 22 output a video to the display 32 based on the received video data.

Thus, either the user device 20 or the multi-game server 13 is responsible for generating video data. The device responsible for generating video data may be changed according to the streaming method.

Note that the streaming user device 21 and the watching user device 22 may display the video by methods that are different from each other. For example, the streaming user device 21 may display the video using the client rendering method, while the watching user device 22 displays the video using the browser rendering method. The configuration may also be such that the user can choose how the video is displayed. For example, some watching user devices 22 may display the video using the client rendering method, while other devices display the video using the browser rendering method.

In the present embodiment, a method is described in which each user device 20 streams video by the client rendering method. The client rendering method will be described in detail.

The storage 26 has recorded therein three-dimensional model data for avatar objects and other objects, and the like. The three-dimensional model data includes rendering data for body parts that make up the main body of the avatar object and attached parts that can be attached to the avatar object. The body parts are parts that constitute sections of the avatar object. Data for rendering the body parts includes polygon data, skeletal data (bones) for representing movement of the avatar object, texture data, and the like. At least some of the body parts may be set as desired by the user. In other words, the height, physique, and the like of the avatar object can be selected by the user. Attached parts include texture data and the like. The streaming user may set their preferred parts as the attached parts of the avatar object corresponding to that user.

The transmission unit 53 of the streaming user device 21 transmits identification information (part ID) indicating the parts of the avatar object to the multi-game server 13 as display control data. The transmission unit 53 also transmits motion data acquired by the acquisition unit 50 and audio data that is based on audio collected by the microphone 30 to the multi-game server 13. Furthermore, the transmission unit 53 transmits, as display control data, identification information of an expression selected by the streaming user from among pre-registered avatar object expressions. This expression of the avatar object is hereinafter referred to as an "emote."

The streaming user may also adjust a position and an imaging area of a virtual camera in a virtual space. Based on user operations, the streaming user device 21 changes an angle or the position of the virtual camera set up in the game field. The streaming user device 21 also expands or reduces the imaging area of the virtual camera set up in the game field based on an operation of the user. The transmission unit 53 may transmit the position of the virtual camera to the multi-game server 13. The motion data and the audio data are given time stamps. The time stamps are generated based on reference time information that is based on timekeeping circuitry (an internal clock) of the control unit 25. In some embodiments, the time stamps are generated based on reference time information transmitted from the multi-game server 13 or reference time information acquired from another external server. The time stamps may represent an elapsed time from a reference time or may represent a time of day.

The watching user device 22 receives a part ID of the avatar object of the streaming user in advance at a prescribed timing, such as when beginning to watch the video. The output control unit 52 receives display control data including motion data from the multi-game server 13. The output control unit 52 then uses the display control data to perform rendering, including the avatar object and objects other than the avatar object. Rendering as used here refers to a rendering process that includes acquiring the position of the virtual camera, perspective projection, hidden surface erasure based on depth information associated with each of the objects, and the like. Rendering may be at least one of these processes or may include shading, texture mapping, and the like. The output control unit 52 also uses the motion data to cause the avatar object to move.

The output control unit 52 also receives data such as messages posted by other users from the multi-game server 13. The output control unit 52 outputs video data that is a composite of a rendered image of the avatar object and other objects, posted messages, notifications, and the like to the display 32. The output control unit 52 also synchronizes the audio data with the video data based on the time stamps and outputs the synchronized data via the speaker 29.

<Operation>

Operation of the real-time server 12, the multi-game server 13, and the user device 20 will be described with reference to FIG. 8 to FIG. 14, along with specific examples of games.

(Before the Game Starts)

The video application offers a plurality of games that can be selected by the user. The user device 20 accepts game selection operations by the user.

The user device 20 make a request to the real-time server 12 to create a room in which a plurality of users can participate. The real-time server 12 creates a room with that user as the host user. The real-time server 12 also transmits information of the room to the host user device 21H and the multi-game server 13. When the host user device 21H receives the information of the room, it displays a lobby screen before the game is run.

The minimum number of people who can participate in a game is one (host user only), and the maximum number of people is, for example, four (one host user and three guest users). When the host user invites another user, the host user device 21H transmits a participation invite to the other user device 20 via the multi-game server 13 (or the real-time server 12) based on operations of the host user. When another user device 20 that receives the participation invite transmits a participation request to the real-time server 12 based on operations of the other user, the real-time server 12 registers that user as a guest user in the game management information 37. Thus, a group composed of a plurality of streaming users participating in the game is created.

In one embodiment, the user device 20 used by the user other than the host user receives the received information of the room from the multi-game server 13 and displays the information of the room. This user device 20 transmits a participation request to the multi-game server 13 (or the real-time server 12) to participate in the game based on operations of the other user. The multi-game server 13 transmits the identification information of the user who transmitted the participation request to the host user device 21H. The host user device 21H displays the identification information of the other user who transmitted the participation request. The host user device 21H also transmits information to the real-time server 12 to the effect that the participation of the other user was approved. Thus, the real-time server 12 registers the user who made the participation request as a guest user in the game management information 37. Note that the host user and guest user are streaming users streaming game video.

The streaming user device 21 of the guest user and the watching user device 22 display the lobby screen. A lobby is a virtual space where the host user and the guest user participating in a game gather before starting the game. In the lobby, the host user and the guest user can communicate through an audio call or chat. The lobby screen includes a respectively corresponding avatar object for each participating host user and guest user. The output control unit 52 also uses motion data of the streaming users to render each avatar object. Note that the streaming user device 21 and the watching user device 22 may display the lobby screen after the game has ended as well.

The host user device 21H accepts a prescribed operation of the host user on an operation object or the like displayed on the lobby screen and transmits a game start request to the real-time server 12. When the real-time server 12 receives the game start request, it starts the game by running a program to progress the selected game. Note that the game may also be played by the host user alone.

(Specific Game Example)

A specific example of a game will be described with reference to FIG. 8, focusing on in-game actions executed by the streaming users. Processes relating to game parameters and processes relating to group parameters will be described as separate processes. Note that the user device 20 is described here as being provided with a touch panel.

Firstly, a first stage will be described. The first progress unit 40 and second progress unit 45 of the real-time server 12 progress a game in which the streaming users fish in a game field 55. The first progress unit 40 displays a plurality of game fields 55 (fishing grounds) so as to be selectable by the host user. The first progress unit 40 records game field information indicating the game field 55 selected by the host user in the game management information 37. Furthermore, the first progress unit 40 and the second progress unit 45 transmit various data necessary for rendering the game field 55 to each streaming user device 21. The game field 55 includes a mobile area 56. The first progress unit 40 and the second progress unit 45 control movement of the moving object 57 within the mobile area 56. The mobile area 56 is a body of water such as an ocean, river, or lake. The moving object 57 may be displayed as a silhouette in the mobile area 56. In some embodiments, the moving object 57 may be displayed in a mode of display by which the type thereof can be identified. The moving object 57 is an object representing a fish or is another object.

The operation detection unit 51 of the streaming user device 21 accepts a first action execution operation of the streaming user using the streaming user device 21 in a prescribed game scene and while an item 58 is not located in the mobile area 56. Specifically, the first action execution operation is a touch operation such as a tap operation, a swipe operation, or a flick operation. The prescribed game scene is a scene in which a cast, which is a first in-game action, can be performed. The cast is an in-game action in which the item 58 associated with the streaming user is placed (dropped) in the mobile area 56. The item 58 is an object that can be owned or used by the user in the game and an object associated with the user at least when the first action execution operation is performed. In this game, the item 58 includes at least one of a float, bait, a lure, a fishing rod, and the like. The item 58 may also be selected by the streaming user.

The transmission unit 53 transmits the game progress data including the first action execution request to the real-time server 12. When the first action execution request is received from the streaming user device 21, the first progress unit 40 executes the cast (game process P1).

The first progress unit 40 controls movement of the moving object 57 and determines whether the relative distance between the moving object 57 and the item 58 reaches a prescribed distance or less. When the relative distance between the moving object 57 and the item 58 reaches the prescribed distance or less, the first progress unit 40 determines that a match condition has been fulfilled (met) (game process P2: hooking). When the match condition is fulfilled, the moving object 57 enters a match-ready (selectable) state. The acquisition unit 50 receives game control data including information indicating that the match condition has been fulfilled from the real-time server 12. The output control unit 52 notifies that the moving object 57 is now selectable, such as by displaying an icon 59 that prompts operation, by movement of the item 58, or by vibration or sound output from the user device 20. Note that when the first progress unit 40 determines that a prescribed operation (for example, a tap operation) is performed on the streaming user device 21 while the match condition is not fulfilled, the cast can be redone by returning the item 58 from the mobile area 56 to an initial position.

When the operation detection unit 51 accepts a second action execution operation (for example, a tap operation), which is an operation performed within a prescribed time after the match condition is met, the transmission unit 53 transmits the game progress data including the second action execution request to the real-time server 12. When the first progress unit 40 receives the second action execution request, it executes a match against the moving object 57 (second in-game action) (game process P3). Based on the game control data received from the real-time server 12, the streaming user device 21 displays movements of the second in-game action in which an avatar object 60 tries to reel in the moving object 57 associated with the item 58 (moving object 57 that was hooked).

The first progress unit 40 determines whether the second in-game action was successful based on a parameter associated with the streaming user and a parameter associated with the moving object 57. For example, the first progress unit 40 determines a success rate (lottery probability) based on an acquisition probability associated with the moving object 57 and a set number of medals, which is the set value set by the streaming user. In this case, the higher the acquisition probability or the set number of medals, the higher the success rate. The first progress unit 40 then conducts a lottery to determine success or failure based on the success rate. Note that by considering the game balance, the success rate may be lower the higher the set number of medals is.

When the first progress unit 40 determines that the streaming user was successful, it records the acquired moving object 57 (acquired object) as a catch in the user information 35 associated with that streaming user (game process P4). The catch may be changed according to the item. The first progress unit 40 also transmits game control data including information on the catch to the streaming user device 21. Note that the catch is associated with the streaming user and thus also functions as a reward (game reward).

When the first progress unit 40 determines that the streaming user has failed, it ends the match without associating the catch. The first progress unit 40 also transmits game control data including information indicating failure to the streaming user device 21. Then, when the first progress unit 40 receives the first action execution request from the streaming user device 21, it executes the cast again.

While game processes P1 to P4 are repeated in this manner, the output control unit 52 causes the moving object 57 to move based on the game control data. Furthermore, the streaming user device 21 receives game control data relating to other streaming users from the real-time server 12. The output control unit 52 then renders the avatar objects 60 corresponding to the other streaming users 70 based on the game control data relating to other streaming users. As a result, the avatar object 60 corresponding to each of the streaming users 70 performs movements of casting, movements of entering matches (movements of trying to reel in the hooked moving object 57), and movements of acquiring the moving object 57. Note that data indicating emotes selected by other streaming users is also included in the game control data. In this case, the output control unit 52 causes the avatar object 60 to perform a movement of the selected emote using motion data corresponding to the emote. The watching user device 22 renders the avatar object 60 in the same way as the streaming user device 21, based on the game progress data transmitted from each streaming user device 21.

The first progress unit 40 also changes the scene in the middle of the first stage. Specifically, the mode of display (background color and the like) of the game screen is changed. At this time, the first progress unit 40 may be configured to change the type of the moving object 57 moving in the mobile area 56.

The second progress unit 45 receives the game progress data from the streaming user devices 21 and transmits the game control data to the streaming user devices 21. The second progress unit 45 places a normal moving object 57 and a special moving object 57 (hereinafter referred to as special object) in the mobile area. Note that no special objects are placed in the first stage.

(First Stage)

Operations of the real-time server 12 in the first stage will be described with reference to FIG. 9, focusing on processes relating to game parameters and processes relating to group parameters.

When the first progress unit 40 accepts the first action execution operation (cast operation) by the streaming user, the set value specification unit 41 specifies the set value set by that streaming user (step S1). The set value specification unit 41 transmits the specified set value to the API server 14. The API server 14 adds the set value to the set value total.

In the present embodiment, the game parameter, which is the set value, is the number of medals. The set value specification unit 41 sets a game speed according to the set number of medals. The game speed shortens a time from the execution of the first in-game action and until the match condition is fulfilled (or until the moving object 57 is in a match-ready state).

Furthermore, the set value specification unit 41 subtracts the set value from the possessed quantity when the first in-game action is performed by the first progress unit 40 (step S2). Specifically, the set value specification unit 41 receives the possessed number of medals, which is the possessed quantity recorded in the user information 35, from the API server 14. The set number of medals is then subtracted from the possessed number of medals. Note that when the first in-game action is redone without the match condition being fulfilled, the set number of medals is added to the possessed quantity to return to the original state.

The multiplier setting unit 42 uses the specified set value to perform a multiplier setting process (step S3). In the multiplier setting process, the boost multiplier used in the second stage is set. The multiplier setting unit 42 records the set boost multiplier in the user information 35 via the API server 14. Note that the multiplier setting process may be performed after an update process for subtracting the set value from the possessed quantity and before the next update process.

The first reward granting unit 43 determines whether the first reward condition is met (step S4). In the present embodiment, the first reward condition is a successful second in-game action by the user on the moving object 57 that is now selectable. The first reward condition changes depending on the content of the game.

When the first reward granting unit 43 determines that the first reward condition has not been met (step S4: NO), processing proceeds to step S6.

When the first reward granting unit 43 determines that the first reward condition is met (step S4: YES), the individual reward is granted (step S5). Specifically, the first reward granting unit 43 determines the individual reward using the set number of medals and the odds (multiplier) of the moving object 57 recorded in the game environment information 36. The higher the odds (for example, "2×"), the greater the number of medals acting as the individual reward. Furthermore, the greater the set number of medals, the greater the number of medals acting as the individual reward. For example, the first reward granting unit 43 determines the individual reward using the set number of medals multiplied by the odds. As described above, the odds are set to a multiplier of 1× or more or a multiplier of less than 1× according to the moving object 57. In other words, depending on the successfully acquired moving object 57, an individual reward greater than or equal to the set value may be obtained, or an individual reward smaller than the set value may be obtained. The odds may be set for each type or each attribute (rarity or the like) of the moving object 57. The odds may be set for each singular moving object 57. In other words, different odds may be set for each of a plurality of moving objects 57 of the same type.

The first reward granting unit 43 transmits the number of medals acting as the individual reward to the API server 14 along with the user ID of the streaming user 70 associated with the individual reward. The API server 14 adds the number of medals to the possessed quantity in the user information 35 based on the user ID.

Note that in the present embodiment, the set value used when determining the individual reward is the set value when the first in-game action (cast) is executed. However, the timing for specifying the set value used when determining the individual reward may be based on a period in which the streaming user can change the set value. For example, the set value specified when the match condition is met may be used to determine the individual reward.

The first progress unit 40 updates the group parameter (step S6). The group parameter is updated when the first in-game action is executed. The group parameter may be updated when the second in-game action is executed. The determination unit 44 determines an amount of increase in the group parameter according to the set value. For example, the determination unit 44 determines the amount of increase in the group parameter based on an increase multiplier for the group parameter that was associated with the set number of medals in advance. The greater the set number of medals, the larger the amount of increase in the group parameter. The first progress unit 40 transmits the amount of increase in the group parameter to the API server 14. The API server 14 updates the group parameter by adding the received amount of increase to the total value of the group parameter in the game management information 37. The determination unit 44 acquires the group parameter from the API server 14 as appropriate and determines whether the value thereof has reached a prescribed value.

The determination unit 44 determines whether the first stage has ended based on whether the mission of the group has been accomplished (step S7).

When the determination unit 44 determines that the mission of the group has not been accomplished, it returns to step S1 because the first stage has not been completed (step S7: NO), and steps S1 through S7 are executed by each function as the game progresses.

When the determination unit 44 determines that the mission of the group has been accomplished (step S7: YES), it ends the first stage. The first progress unit 40 transmits data control data including a request to move to the second stage to the streaming user device 21. When the streaming user device 21 receives this data control data, it displays a screen of the second stage. Note that when the elapsed time from the start of the first stage reaches a time limit, the game itself may be ended without moving to the second stage.

(Multiplier Setting Process)

A multiplier setting process will be described with reference to FIG. 10. The multiplier setting unit 42 specifies the set value total as the set value (step S10). Specifically, the multiplier setting unit 42 acquires the set value total of the user information 35 (for example, "1000") from the API server 14. The multiplier setting unit 42 also adds the set number of medals specified in step S1 (for example, "100") to the set value total (for example, "1100").

The multiplier setting unit 42 also determines whether to update the boost multiplier (step S11). The set value total has a plurality of threshold values (for example, "1100" and "1200") set in a stepwise manner. The multiplier setting unit 42 determines that the boost multiplier is updated each time the set value total reaches a new threshold value.

When the multiplier setting unit 42 determines that the set value total has reached a threshold (step S11: YES), it updates the boost multiplier (step S12). At this time, the multiplier setting unit 42 conducts a lottery for the boost multiplier. In other words, one boost multiplier is selected from a plurality of boost multipliers. At this time, the multiplier setting unit 42 selects a higher multiplier than the boost multiplier recorded in the user information 35. Thus, each time the total set value total reaches a threshold value, the boost multiplier is increased. The multiplier setting unit 42 records the boost multiplier obtained through the lottery in the user information 35 via the API server 14. Furthermore, when the boost multiplier is updated, the multiplier setting unit 42 includes the boost multiplier in the game control data and transmits this to the streaming user device 21.

Conversely, when the multiplier setting unit 42 determines that the set value total has not reached the threshold (step S11: NO), it ends the process.

(Second Stage)

Operations of the real-time server 12 in the second stage will be described with reference to FIG. 11, focusing on processes relating to game parameters and processes relating to group parameters.

The set value specification unit 41 sets the set value. In the second stage, the set value specification unit 41 sets the number of medals, which is the set value, to a maximum value.

The second reward granting unit 46 determines whether the second in-game action was successful in the second stage (step S16). When the second reward granting unit 46 determines that the second in-game action failed (step S16: NO), processing proceeds to step S20.

When the second reward granting unit 46 determines that the second in-game action was successful (step S16: YES), it determines whether the second reward condition is met by the playing status of any of the streaming users belonging to the group (step S17). In the foregoing specific game example, the second reward condition is that the moving object that is the target of the second in-game action is a special object and that the second in-game action was successful. The second reward condition changes depending on the game.

When the second reward granting unit 46 determines that the second reward condition is not met (step S17: NO), it grants the individual reward (step S21) because the second in-game action on the normal moving object 57 was successful. The second reward granting unit 46 determines the individual reward in the same manner as in the first stage.

When the second reward granting unit 46 determines that the second reward condition was met by the playing status of any of the streaming users belonging to the group (step S17: YES), it grants the group reward to each streaming user (step S18). The second reward granting unit 46 acquires, via the API server 14, the boost multiplier for each streaming user recorded in the user information 35. The second reward granting unit 46 acquires, via the API server 14, the odds of the moving object 57 acquired by the streaming user, from among the odds recorded in the game environment information 36.

Then, the odds associated with the moving object 57 and the boost multiplier for each streaming user are then used to determine the value of the game parameter (number of medals) as the group reward for each streaming user. The odds of special objects are set to be higher than those of normal objects. Furthermore, the higher the odds, the greater the value of the game parameter granted to each streaming user. Moreover, the higher the boost multiplier of the streaming user, the greater the value of the game parameter granted to that streaming user. For example, the second reward granting unit 46 calculates the group reward by multiplying the odds, the boost multiplier, and a constant that uses the set number of medals.

The second reward granting unit 46 transmits the group reward and the user IDs of the streaming users 70 to which the group reward is associated with the API server 14. Based on the user IDs, the API server 14 adds the value of the game parameter acting as the group reward to the respective possessed quantity included in the user information 35 of each streaming user.

In addition to the information relating to the group reward determined for each streaming user, the second reward granting unit 46 includes an execution request for a special cutscene in the game control data and transmits this to the streaming user device 21 (step S19). At this time, in the game control data, the value of the game parameter acting as the group reward is transmitted to the streaming user device 21 to which the group reward was granted. The second reward granting unit 46 also transmits the same game control data as the host user to the watching user device 22.

The output control units 52 of the streaming user device 21 and the watching user device 22 output a screen of a special cutscene based on the game control data. The special cutscene is a cutscene that is output when the second reward condition is met.

When the second reward granting unit 46 determines that the second in-game action failed (step S16: NO), or when the second in-game action for the normal moving object 57 was successful (step S17: NO), the individual reward was granted (step S21), and an execution request for the special cutscene was transmitted (step S19), the second progress unit 45 determines whether the second stage has ended (step S20). An end condition for the second stage is that the group parameter has reached a lower limit.

When the second progress unit 45 determines that the second stage has been ended (step S20: YES), the game is ended. When the second progress unit 45 determines that the second stage has not been ended (step S20: NO), processing returns to step S16.

A specific example of when the individual reward is granted to the streaming users will be described with reference to FIG. 12. In the example in FIG. 12, it is assumed that two streaming user 70 (host user 70H and guest user 70G) are participating in the game. The real-time server 12 transmits and receives data such as set values, possessed quantities, set value totals, boost multipliers, remaining time, and group parameters to and from the API server 14.

The first progress unit 40 of the real-time server 12 receives game progress data including a set number of medals 71 (for example, "100") wagered by the host user 70H from the streaming user device 21 of the host user 70H. The first progress unit 40 also receives game progress data including a set number of medals (for example, "200") wagered by the guest user 70G.

The first progress unit 40 subtracts the set number of medals (consumed medals) from the possessed number of medals of the host user 70H (for example, "1000") to update the possessed number of medals of the host user 70H (for example, "900"). Furthermore, the first progress unit 40 subtracts the set number of medals from the possessed number of medals of the guest user 70G (for example, "1000") to update the possessed number of medals of the guest user 70G (for example, "800").

When the first reward granting unit 43 determines that a match of the host user 70H against the moving object 57 was successful, it grants an individual reward 72 according to the set number of medals 71 wagered by the host user 70H. The first reward granting unit 43 updates the possessed quantity by newly adding a number of medals (for example, "200") as the individual reward 72 to the possessed number of medals associated with the host user 70H (for example, "1100"). The moving object 57 is also associated with the host user 70H.

In the exemplary case, guest user 70G was successful in a match against the same moving object 57 as the moving object 57 associated with host user 70H. When the set number of medals 71 (for example, "200") of the guest user 70G is greater than the set number of medals 71 of the host user 70H, the individual reward 72 granted to the guest user 70G (for example, "400") is greater than the individual reward 72 granted to the host user 70H. The first reward granting unit 43 updates the possessed quantity (for example, "1200") by adding the individual reward 72 to the possessed number of medals associated with the guest user 70G. Note that when failing in the match against the moving object 57, the set number of medals 71 are subtracted from the possessed quantity, while no individual reward 72 is granted.

When the determination unit 44 receives an execution request for a cast from each of the streaming user devices 21, it increases the total value of the group parameter, regardless of whether the second in-game action was successful. The streaming user device 21 represents the total value of the group parameter in a group gauge 73. The units of the group parameter may be unique units (for example, "1", "2") or the number of medals.

Thus, in the first stage, the streaming users 70 essentially enjoy matches against the moving object 57 individually. The first reward granting unit 43 also grants the individual reward 72 based on the results of the matches. Meanwhile, the first progress unit 40 increases the group parameter based on execution of casts by the streaming users 70. The group parameter increases regardless of the results of the matches, and thus it is possible to move to the second stage by the efforts of each streaming user, regardless of experience playing the game, streaming user technique, and the like. Thus, it is possible to elevate the desire of users toward the game. Furthermore, even users who play the game for the first time can play the game without worrying about differences in playing experience from users who have already played the game. Furthermore, the more users participating in the game, the faster the group parameter increases. Thus, it is possible to encourage host users to make a participation invite to another user.

A specific example of when the group reward is granted to the streaming users will be described with reference to FIG. 13.

In the first stage, the multiplier setting unit 42 of the real-time server 12 sets boost multipliers 74H and 74G for each streaming user 70 according to the set number of medals 71. Specifically, the multiplier setting unit 42 totals (for example, "600") the set number of medals 71 consumed each time an action execution operation by a streaming user 70 is accepted (for example, "100," "200," and "300") for each streaming user 70. Also, when the total value of the set number of medals 71 reaches a threshold value (for example, "500"), the multiplier setting unit 42 draws one boost multiplier 74H or 74G from the boost multipliers (for example, "x2," "x3," . . . ). Drawing the boost multiplier in this way increases randomness making it possible to elevate the entertainment value of the game.

When the group parameter reaches a maximum value in the first stage, the second progress unit 45 progresses the game to the second stage. Note that the second progress unit 45 does not subtract the number of medals set by the streaming user from the possessed number of medals of the streaming user 70 even when the cast is executed.

In FIG. 13, for example, it is presumed that the playing status of the host user 70H has met the second reward condition. In this case, the second reward granting unit 46 uses the boost multiplier 74H (for example, "x2") set for the host user 70H to determine the number of medals acting as the group reward 75 (for example, "5,000") for the host user 70H. Furthermore, the second reward granting unit 46 uses the boost multiplier 74G (for example, "x4") of the guest user 70G to determine the number of medals acting as the group reward 75 (for example, "10,000") for the guest user 70G. In other words, even when the host user 70H meets the second reward condition but the guest user 70G does not meet the second reward condition, the group reward 75 is granted to all streaming users 70 participating in the game. Furthermore, the respectively granted group reward 75 is determined according to the boost multipliers 74H and 74G associated with each of the streaming users 70, and thus the group reward 75 granted to the guest user 70G may be higher than the group reward 75 granted to the host user 70H who met the second reward condition.

Thus, in the second stage, the group reward is granted not only by the streaming user themselves meeting the second reward condition, but also by other streaming users 70 who participate in the group meeting the second reward condition. Therefore, in the second stage, in addition to the fun of obtaining rewards according to the set number of medals 71 wagered by the streaming users 70, it is also possible to elevate a sense of solidarity between the streaming users. Accordingly, it is possible to prevent giving the streaming users 70 the impression that the game is monotonous. Furthermore, the number of medals is more likely to increase in the second stage than in the first stage. Thus, it is possible to let the streaming users experience the fun created by the number of medals increasing quickly.

Furthermore, by increasing the set number of medals 71 in the first stage, the boost multiplier used in the second stage more readily increases. Thus, it is possible to increase the motivation of each streaming user 70 in the first stage. Furthermore, a game in which numbers of medals are wagered in this way has randomness, and thus users who do not prefer randomness tend to not participate in the game. However, by configuring the game to be played by a plurality of users in this way, the number of elements that the users can enjoy increases. Thus, it is possible to soften the impression of randomness of the game.

<Special Cutscene>

Next, the special cutscene (step S19) will be described in detail. Here, a period during which the games of the first stage and the second stage are run, except for the period during which the special cutscene takes place, is referred to as a game progress period. The period during which the special cutscene takes place is a period during which photographing is possible (hereinafter referred to as a photographing period). The photographing period is started by the second reward condition, which is an acquisition condition, being met.

When the output control unit 52 of the streaming user device 21 receives an execution request for the special cutscene from the real-time server 12, it starts the photographing period in which the avatar object 60 is photographed. Progress of the game is suspended during the photographing period. For example, the real-time server 12 suspends decreasing of the group parameter. The output control unit 52 suspends display of the game screen during the photographing period. Furthermore, the output control unit 52 uses tracking data detected by the movement detection unit 54 to display on the special cutscene screen the avatar object 60 that reflects movements such as facial expressions of the streaming user 70. The avatar object 60 that reflects movements such as facial expressions of the streaming user 70 is the avatar object 60 in a second mode of display. Furthermore, the output control unit 52 uses tracking data of another streaming user 70 acquired by the acquisition unit 50 to display an avatar object 60 that reflects movements such as facial expressions of the other streaming user 70 in the special cutscene screen. Note that when the streaming user 70 using an own device (user device 20 or variant thereof) or another streaming user 70 has selected an emote function, the output control unit 52 uses motion data corresponding to a selected emote to display the avatar object 60.

Furthermore, during the photographing period, the output control unit 52 records an image including the avatar object to the storage 26 based on an operation of the streaming user 70 (photographing operation). An end condition of the photographing period is the operation detection unit 51 having accepted an operation by the streaming user 70 to close the special cutscene screen or a prescribed time having passed from starting the photographing period.

When the photographing period ends, along with ending the photographing period and ending display of the avatar object 60 that uses the tracking data, the output control unit 52 starts the game progress period and displays the game screen.

During the photographing period, the second progress unit 45 may execute at least a portion of game processing for the second stage while suspending progress of the game. For example, when another streaming user 70 is in a match directly before starting the photographing period, calculation of success rate and determination of success and failure may be performed.

Furthermore, when the game progress period is resumed, the output control unit 52 may display the game screen based on the game progress data from directly before starting the photographing period. The game progress data includes the playing status of the other streaming user 70. For example, when a streaming user 70 other than the streaming user 70 who met the second reward condition directly before the photographing period was performing the first in-game action (cast), the output control unit 52 displays the game screen in a state in which that streaming user 70 is performing the first in-game action.

When the game progress period is resumed, the output control unit 52 may set the playing status of each streaming user 70 to an initial state from before the first in-game action (cast) was performed.

When the second progress unit 45 determines that another streaming user 70 meets the second reward condition directly before the photographing period from when one streaming user 70 meets the second reward condition, special cutscenes may be performed in succession.

<Picture Guide>

A process of registration to the picture guide executed by the first progress unit 40 and the second progress unit 45 will be described with reference to FIG. 14. The process of registration to the picture guide is performed on the picture guide associated with a streaming user 70 when that streaming user 70 has met the acquisition condition of an object. the acquisition condition is that the streaming user 70 has successfully completed the second in-game action. Now it will be described how the first progress unit 40 performs registration to the picture guide when the acquisition condition is met in the first stage. Note that the second progress unit 45 also similarly performs a picture guide registration process.

The order in which game fields 55 are opened for the user is predetermined. Furthermore, the moving object 57 is associated with the game field 55. When the streaming user 70 is successful in the second in-game action, the first progress unit 40 registers the moving object 57 to the picture guide (step S26). Specifically, the first progress unit 40 transmits to the API server 14 the object ID of the moving object 57, the user ID of the streaming user 70 who acquired the moving object 57, and a registration request. Of the user information 35 corresponding to the user ID, the API server 14 registers the object ID of the moving object 57 to the picture guide of the game field 55 associated with the moving object 57.

The first progress unit 40 acquires a completion rate of the picture guide specified in step S27 in each game field 55 associated with the streaming user who succeeded in the second in-game action (step S27). Specifically, the completion rate represents a ratio of the number of moving objects 57 registered to the picture guide to the number available for registration to the picture guide. The first progress unit 40 may acquire the completion rate calculated by the API server

14. In some embodiments, the first progress unit 40 may acquire the number available for registration and the number of moving objects 57 registered to the picture guide from the API server 14 and calculate the completion rate.

The first progress unit 40 determines whether the completion rate is greater than or equal to a prescribed rate (step S28). When it is determined that the completion rate (for example, 60%) is less than the prescribed rate (for example, 80%) (step S28: NO), processing is on standby until the next successful second in-game action by the streaming user 70.

Conversely, when the first progress unit 40 determines that the completion rate (for example, 85%) is greater than the prescribed rate (for example, 80%) (step S28: YES), a new game field 55 is opened for that streaming user 70 in accordance with a predetermined opening order (step S29) For example, a lowest priority (lowest assigned number) game field 55 from among unopened game fields 55 is opened. The first progress unit 40 records the opened game field 55 in the user information 35. Thus, the streaming user 70 can start a game on the opened game field 55 when they become the host user 70H.

Essentially, users can play games on game fields 55 opened for them. However, when a user participates in a game as the guest user 70G as described above, even when the game field 55 is not opened for the guest user 70G, games can be played insofar as the game field 55 is opened for the host user 70H. The guest user 70G can also register the moving object 57 in the picture guide associated with the game field 55, even when the game field 55 is not opened for that guest user 70G.

Even when the game field 55 is not open to the guest user 70G, the guest user 70G may be allowed to play games on that game field 55 when the completion rate of the picture guide exceeds the prescribed rate.

<Display Screen>

Examples of various screens displayed on the display 32 of the user device 20 when a game wherein fishing is performed is run will be described with reference to FIG. 15 to FIG. 18.

FIG. 15 illustrates one example of a game screen 80 displayed by the streaming user device 21. The example in FIG. 15 shows the game screen 80 in the first stage. The output control unit 52 receives the game environment information 36 from the API server 14. The output control unit 52 also receives the game control data from the real-time server 12. Furthermore, the output control unit 52 receives the display control data for rendering avatar objects 60 from the multi-game server 13. Also, the output control unit 52 uses these types of information to display the game screen 80.

The game screen 80 includes a background of the game field 55. The game screen 80 also includes images of the avatar objects 60, fishing rods 81, the item 58, the mobile area 56, and moving objects 57. In the example in FIG. 15, two streaming users 70 are participating in the game.

The output control unit 52 also uses motion data of predetermined in-game actions to render the avatar objects 60 based on operations of the streaming users 70. In-game actions include movements of casting, movements of entering matches against the moving objects 57, and movements of reeling in the moving objects 57. In the game progress period, in order to reduce processing load on the user devices 20, the output control unit 52 renders the avatar objects 60 without using the motion data in which the facial expressions of the streaming users 70 are detected.

The operation detection unit 51 accepts selection of the emote function by the streaming user 70. Moreover, note that after performing a cast, the operation detection unit 51 does not accept selection of emotes by the streaming users until the match ends or until the item is retrieved without entering a match. The output control unit 52 uses motion data corresponding to the selected type of emote to render the avatar object 60. The output control unit 52 also receives information designating an emote selected by the other streaming user 70 from the multi-game server 13. Motion data designated by the other streaming user 70 is then used to render the avatar object 60.

The game screen 80 includes an individual gauge 82 and a group gauge 83. The individual gauge 82 represents the set number of medals. In the example in FIG. 15, when the operation detection unit 51 accepts operations of a plus button and a minus button of the individual gauge 82, the output control unit 52 increases a gauge value of the individual gauge 82. The transmission unit 53 also transmits the set number of medals to the real-time server 12. A number of medals display section 84 indicating the set medals is adjacent to the individual gauge 82.

The output control unit 52 uses the group parameter received from the API server 14 to display the group gauge 83. The group gauge 83 represents the value of the group parameter. In the second stage, the individual gauge 82 automatically reaches a maximum value. Furthermore, when the second stage is started, the group gauge 83 is at a maximum value but decreases over time.

Moreover, the game screen 80 includes a speed display section 85, a multiplier display section 86, and a possessed medals display section 87. The output control unit 52 displays these based on a speed value (not illustrated), the boost multiplier, and the possessed quantity, each being received from the API server 14. The speed display section 85 indicates a speed at which the group parameter increases. The multiplier display section 86 indicates the boost multiplier for the streaming users 70. The possessed medals display section 87 indicates the number of medals, which is the possessed quantity recorded in the user information 35 of the streaming users 70. Note that the streaming user device 21 displays the individual gauge 82, the speed display section 85, the multiplier display section 86, and the possessed medals display 87 corresponding to the streaming user 70 using the own device.

Furthermore, the game screen 80 includes a picture guide display button 88A, an emote selection button 88B, and a camera button 88C. The transmission unit 53 transmits the user ID and a picture guide transmission request to the API server 14 when the picture guide display button 88A is selected by the streaming user 70. The acquisition unit 50 receives information relating to the picture guide from the API server 14 and also displays the picture guide associated with that streaming user 70. When the emote selection button 88B is selected, the output control unit 52 displays a plurality of emotes so as to be selectable. The output control unit 52 uses the emote selected by the streaming user to render the avatar object 60 corresponding to the streaming user. The transmission unit 53 also transmits information designating the selected emote to the multi-game server 13. The output control unit 52 photographs the game screen when the camera button 88C is selected.

The watching user device 22 displays a game screen (not illustrated) similar to that of the streaming user device 21, except for the individual gauge 82, the multiplier display section 86, and the possessed medals display section 87. The game screen displayed by the watching user device 22 includes the group gauge 83 and the speed display section 85.

The game screen displayed by the watching user device 22 also includes a rating button, a gift button, a camera button, and a collaboration button (none of which are illustrated). The rating button is a button for the watching user to express a favorable rating of the stream (for example, "Nice!" and the like). The gift button is a button for giving a gift to the streaming users 70. When the gift button is selected by the watching user, the watching user device 22 transmits a gift display request to the multi-game server 13. After the game has ended, the multi-game server 13 displays a gift object corresponding to the gift display request on the screen. The camera button is a button for capturing the screen. The collaboration button is a button to participate in the game.

In the game screen 80 illustrated in FIG. 15, the number of medals display section 84, the group gauge 83, and the speed display section 85 are efficiently displayed such that they can be easily seen on a small screen such as that of a smartphone. Furthermore, the individual gauge 82 is positioned so as to be easily operable with one hand by the user. Moreover, the individual gauge 82 and the group gauges 83 have elongated shapes. A longitudinal direction of the individual gauge 82 is a first direction (horizontal), and a longitudinal direction of the group gauge 83 is a second direction (vertical). Thus, even when there are multiple gauges in the game screen 80, it is possible for the user to distinguish between these at a glance.

FIG. 16 is one example of a reward screen 90 that notifies the streaming users 70 that the individual reward has been granted. The reward screen 90 is displayed in a granting process of the individual reward in the first stage (step S5) and in a granting process of the individual reward in the second stage (step S21).

The reward screen 90 includes a catch display section 91. The catch display section 91 displays a moving object 57 for which the second in-game action was successful as the catch. Attributes of the moving object 57 (name, size, and weight) are also displayed on the reward screen 90. The reward screen 90 also includes a number of medals 92 acting as the individual reward. This screen is a screen that uses the streaming user device 21 to indicate that the individual reward has been granted to that streaming user 70. When the individual reward is granted to the other streaming user 70, a reward screen in another mode of display is displayed. For example, this reward screen is displayed such that the streaming user 70 that acquired a catch is associated with that catch. The image of the individual reward granted to the other streaming user 70 may have a smaller image size compared to the image of the individual reward acquired by the streaming user 70 using the own device. In some embodiments, the amount of information included in the image of the individual reward granted to the other streaming user 70 may be smaller than the amount of information included in the image of the individual reward acquired by the streaming user 70 using the own device. Furthermore, an image relating to the catch granted to the other streaming user 70 may have a smaller image size or smaller amount of information compared to the image of the catch acquired by the streaming user 70 using the own device. When multiple 70 streaming users acquire individual rewards, images of individual rewards are displayed frequently, but, for example, by making the images of individual rewards granted to the other 70 streaming user smaller, it is possible to prevent actions of the streaming user 70 on the own device and movements of each streaming user 70 from be hidden by the images of the individual rewards. It is also possible to prevent the screen from becoming difficult to see or game progress from being inhibited.

FIG. 17 illustrates one example of a special cutscene screen 95 displayed by the streaming user device 21. The special cutscene screen 95 is displayed in a process for performing a special cutscene (step S19).

The special cutscene screen 95 includes the avatar objects 60 participating in the game. The output control unit 52 displays each avatar object 60 in a size that allows at least the facial expressions to be discerned from the user's point of view. The output control unit 52 also displays the avatar objects 60 as reflecting the motion data indicating the movements of the streaming users 70. The movements of the streaming users 70 include at least one of head (neck), arm, hand, and torso movements, in addition to the facial expressions of the streaming users 70. Furthermore, when the streaming user 70 has selected an emote function, the output control unit 52 uses motion data corresponding to a selected emote to display the avatar object 60. Note that the special cutscene screen 95 may include an image of an acquired special object 106 (moving object 57). Furthermore, the acquired special object 106 may be displayed after being associated with a prescribed part of the avatar object 60 (for example, a hand) that acquired said special object 106. By associating the special object 106 with the prescribed part, the special object 106 is displayed as in contact with the prescribed part. Thus, the avatar object 60 is displayed holding the special object 106.

The special cutscene screen 95 includes the emote selection button 88B, the camera button 88C, and an end button 96. When the emote selection button 88B is selected, the output control unit 52 of the user device 20 displays an emote selection section (not illustrated) displaying a plurality of icons indicating each emote. The streaming user 70 selects one of the icons displayed in the emote selection section. The streaming user device 21 transmits information designating motion data corresponding to the selected icon to the multi-game server 13. The multi-game server 13 transmits display control data including the information indicating motion data to the other user device 20. Note that the multi-game server 13 may be configured to transmit the motion data itself.

When the camera button 88C is selected by the streaming user 70, the output control unit 52 captures (photographs) the screen. At this time, the output control unit 52 of the streaming user device 21 may be configured to erase each icon and capture the screen. The output control unit 52 then records the captured photographed image in the storage 26. Furthermore, when the camera button (not illustrated) is selected by the watching user, the watching user device 22 captures (photographs) the screen and records the photographed image in the storage 26.

When the facial expressions of the streaming user 70 are reflected on the avatar object 60 while running the game, the processing load on the user device 20 increases. When the streaming method is the server rendering method, the processing load on the multi-game server 13 increases. Furthermore, it becomes difficult to synchronize the facial expressions on the avatar object 60 to the progress of the game, such as being delaying reflection thereof.

Therefore, by providing a time to photograph the avatar object 60 in a state in which the game is interrupted from the user's point of view as described above, it is possible to give a sense of solidarity of sharing the same game space to the streaming users 70 while reducing the processing load on the user device 20. The streaming user 70 can perform a variety of cutscenes on the special cutscene screen 95. Furthermore, due to the special cutscene screen 95 being displayed, it is possible to prevent the watching user from becoming bored with watching the video. Moreover, when a plurality of streaming users participate in a game, it is difficult for the streaming users to check the playing status of other streaming users because they are concentrating on their own gameplay. In the game described above, by providing a special cutscene when another streaming user successfully performs the second in-game action, it is possible to secure time for other streaming users to praise having acquired a special object. Thus, it is possible to facilitate communication between streaming users.

FIG. 18 illustrates one example of a picture guide screen 100. The streaming user device 21 displays the picture guide screen 100 when the picture guide display button 88A (for example, this is included in the game screen 80 in FIG. 15 and FIG. 16) is selected by the streaming user 70. The picture guide screen 100 includes a list of objects. In the present embodiment, the screen of the streaming user device 21 while running the game displays the picture guide display button 88A. The streaming user 70 may select the picture guide display button 88A while the game is running to display the picture guide screen 100. Furthermore, the picture guide display button 88A is also displayed on the lobby screen. The streaming user 70 may select the picture guide display button 88A before the game starts and after the game ends to display the picture guide screen 100.

The picture guide screen 100 includes a field identification section 101 and an object display section 102. The output control unit 52 displays moving objects 57 acquired by the streaming user 70 as the object display section 102, in association with the game field 55 represented by the field identification section 101. As described above, the game field 55 is associated with a prescribed number of moving objects 57 that can be acquired in that game field 55. The object display section includes an acquired object display section 102A showing the moving objects 57 already acquired by the streaming user 70 and an unacquired object display section 102B showing the moving objects 57 that can be acquired but have not yet been acquired. The acquired object display section 102A can accept operations performed by the streaming user 70. The acquired object display section 102A and the unacquired object display section 102B are associated with a rarity (rarity) 103 of the corresponding moving object 57.

The acquired object display section 102A includes images of the moving objects 57. The unacquired object display section 102B does not display the moving objects 57. In some embodiments, as illustrated in FIG. 18, the unacquired object display section 102B may be in a state where the type of the moving objects 57 cannot be determined at first glance, such as a mode wherein only silhouettes of the moving objects 57 are displayed. The picture guide screen 100 also includes a number of objects display section 110 displaying the number of moving objects 57 that can be acquired in that game field 55 and the number of moving objects 57 that have been acquired.

As illustrated in FIG. 19, the output control unit 52 displays an object display screen 105 when an operation to select the acquired object display section 102A by the streaming user 70 is accepted. The acquisition unit 50 requests information for displaying the object display screen 105 from the API server 14 or acquires such in advance. The object display screen 105 includes images of the moving objects 57, as well as the names, attributes, rarities of the moving objects 57 and the number of times the moving objects 57 have been acquired. Attributes include the total length and weight of the moving objects 57. The rarity is the rarity of the moving objects 57. The number of medals that can be obtained by the streaming user 70 may increase the higher the rarity is.

The streaming user 70 might acquire a moving object 57 that is of the same type as a moving object 57 already registered in the picture guide but with different attributes such as total length and weight. When a moving object 57 that is already registered in the picture guide is acquired, the first progress unit 40 or the second progress unit 45 updates the number of times the same moving object 57 has been acquired, via the API server 14. The output control unit 52 displays the number of times the moving object 57 has been caught on the object display screen 105. In this case, the first progress unit 40 or the second progress unit 45 may be configured to register a plurality of moving objects 57 in the picture guide. In some instances, the first progress unit 40 or the second progress unit 45 compares the attributes of the moving objects 57 that have already been registered with the newly acquired moving object 57. Also, moving objects 57 that have a higher rarity or larger (or smaller) parameter as a result of the comparison may be newly registered in the picture guide. For example, when a moving object 57 of the same type is acquired, the moving object 57 having the largest total length or weight included in the attributes may be registered in the picture guide.

The watching user can see the picture guide screen 100 when the host user 70H displays the picture guide screen 100. For example, the streaming user device 21 and the watching user device 22 display the picture guide screen 100 of the host user 70H on the lobby screen that is displayed after the game ends. By displaying such a picture guide screen 100, it is possible to make the user feel the fun of collecting the moving objects 57.

<Hardware Configuration>

One example of processing circuitry will be described with reference to FIG. 23. FIG. 23 is a block diagram of processing circuitry of the user device 20 disclosed in the present Specification. A processing circuit 200 corresponds to the control unit 25 and the communication interface 27 illustrated in FIG. 2. Note that each of the servers 12 to 14 has control circuitry of a similar configuration.

The processing circuit 200 includes a CPU 201, which is a processor that executes one or more of the control processes disclosed in the present Specification, and a memory 202. Processing data and instructions may be stored in the memory 202. Furthermore, these processing data and instructions may be stored in the storage 26, which is a storage medium disk such as a hard drive (HDD) or a portable storage medium or may be stored in a storage medium provided separately from the processing circuit 200. The storage 26 is connected to the CPU 201 via a bus 210 and a storage controller 203.

Each of the functions disclosed in the present Specification is not limited to the CPU 201 and may be implemented using general-purpose processors, special-purpose processors, integrated circuitry, ASICs (application-specific integrated circuits), conventional circuitry, and/or circuitry that may include a combination thereof, being configured or programmed to perform the disclosed functions. A processor includes transistors and other circuitry therein and thus is processing circuitry or a circuit. The processor may be a programmed processor that runs a program stored in memory. In this disclosure, a unit or means, such as processing circuitry or a first output control unit, is hardware that executes or is programmed to execute the functions mentioned. The hardware may be any hardware disclosed in the present Specification or otherwise known and programmed or configured to execute the functions mentioned.

Furthermore, the processor is not limited by the form of the computer readable medium in which the process instructions are stored. For example, the instructions may be stored on a CD, DVD, FLASH memory of an information processing device communicating with the processing circuit 200, RAM, ROM, PROM, EPROM, EEPROM, hard disk, or other non-transitory computer readable medium, for example, a server or computer, Furthermore, the process may be stored in network-based storage, cloud-based storage, or other storage accessible via mobile and executable by the processing circuit 200.

Descriptions or blocks in the flowcharts disclosed in the present Specification can be understood as representing modules, segments, or portions of code including one or a plurality of executable instructions for implementing a specific logical function or step in the process. Furthermore, the foregoing descriptions or blocks may execute functions in an order different from the order illustrated or described in the present Specification, such as substantially simultaneously or in reverse order.

Hardware elements for realizing the processing circuit 200 may be realized by various circuit elements. Furthermore, each of the functions of the embodiment described above may be realized by circuitry including one or a plurality of processing circuits.

The processing circuit 200 also includes a network controller 206 for connecting to a network NW. The network NW may be a public network such as the Internet, a private network such as a local area network (LAN) or wide area network (WAN), or any combination thereof and may also include a public switched telephone network (PSTN) or an Integrated Services Digital Network® (ISDN) sub-network. The network NW may also be wired, such as an Ethernet® network or universal serial bus (USB) cables, or wireless, such as a cellular network including 3G, 4G, and 5G wireless cellular systems. Furthermore, the wireless network may be Wi-Fi®, wireless LAN, Bluetooth®, or another known form of wireless communication. Moreover, the network controller 206 may comply with other direct communication standards such as Bluetooth®, near field communication (NFC), or infrared.

The processing circuit 200 is further provided with a display controller 205 and an input/output interface 207. These are connected to the bus 210. The display controller 205 connects to the display 32. The input/output interface 207 connects to a touch panel 208 and peripheral devices 209. The peripheral devices 209 are, for example, speakers and microphones. Each server 12 to 14 may be configured without the display controller 205 and the input/output interface 207.

The effects of the first embodiment will be described below.

(1-1) In a game in which a reward is granted according to a set value wagered by a streaming user 70, when one streaming user 70 belonging to a group has met a second reward condition, the second progress unit 45 grants a group reward 75 to each streaming user 70 belonging to the group. Thus, it is easier for each of the streaming users 70 participating in the game to gain a sense of solidarity. Thus, it is possible to, in comparison to games in which set values are wagered individually to acquire rewards, prevent users from getting an impression that the game is monotonous and elevate the entertainment value of the game.

(1-2) The first progress unit 40 subtracts the set value from the possessed quantity associated with the streaming user 70 by executing the first in-game action based on the first action execution operation. Also, when the second in-game action is successful, the possessed quantity is then added to the individual reward 72 according to the set value. Thus, it is possible to give the streaming users 70 the fun of the individual reward 72 increasing according to the set value.

(1-3) The first progress unit 40 increases the boost multiplier according to the set value. Furthermore, the second reward granting unit 46 increases the group reward 75 according to the boost multiplier. In other words, the playing status using the set value in the first stage affects the group reward 75. Thus, it is possible to elevate the desire of the streaming users 70 to play the first stage.

(1-4) In the second stage, the higher the odds of the moving object 57, the greater the group reward 75 becomes. Thus, it is possible to elevate the desire for matches with moving objects 57 having high odds.

(1-5) The group parameter is decreased according to time, and the second stage is ended when it reaches a lower limit. Thus, it is possible to provide a game having a sense of tension.

(1-6) The first progress unit 40 and second progress unit 45 are configured to determine by lottery whether the first reward condition and the second reward condition are met. Thus, it is possible to provide a game having randomness.

(1-7) When the playing status of a streaming user 70 meets a photographing condition (success of the second in-game action in the present embodiment), the output control unit 52 starts a photographing period in which the avatar object 60 is photographed. Furthermore, the progress of the game screen is suspended during the photographing period, and tracking data is used to display the avatar object 60 in a second mode of display that reflects the movement of the streaming user 70. Thus, it is possible for the streaming user 70 to interrupt game operations and conduct a variety of cutscenes. Furthermore, when a plurality of streaming users 70 are participating in a game, it is possible to elevate the sense of solidarity between the streaming users 70. At this time, the avatar object 60 does not reflect the movements of the streaming users 70 during the game progress period, and thus it is possible to reduce the processing load on the user device 20 during the game progress period.

(1-8) When a streaming user 70 meets the second reward condition (photographing condition), the output control unit 52 suspends the progress of the game for all streaming users 70 and displays avatar objects 60 reflecting respective movements of each streaming user 70. During the photographing period, the streaming users 70 do not have to concentrate on the game, making it easier to communicate with other streaming users 70.

(1-9) The output control unit 52 records photographed images in the storage 26 in association with an image of a moving objects 57 acquired by the streaming user 70. Thus, the streaming user 70 can check a record of when the moving object 57 was acquired.

(1-10) When a guest user has acquired a moving object 57 in a game field 55 associated with the host user, the output control unit 52 displays the moving object 57 in the picture guide of the guest user, regardless of whether the game field 55 is associated with the guest user. Thus, it is possible to give users with an incentive to participate in games that can be played by a plurality of users.

Second Embodiment

A second embodiment of the program, the information processing method, and the information processing system will be described below according to FIG. 20 and FIG. 21. The second embodiment differs from the first embodiment in that information relating to streaming of the game video is saved in the picture guide when a streaming user 70 has met the second reward condition. Hereinafter, the same symbols are used for portions that are the same as in the first embodiment, and detailed descriptions thereof are omitted.

As illustrated in FIG. 20, the multi-game server 13 records streaming history information 115 in the game information storage unit 16. The streaming history information 115 is recorded when a room is created. The multi-game server 13 updates the streaming history information 115 based on streaming conditions of the game video until the streaming of the video ends or the game ends. The streaming conditions includes information relating to the streaming users 70, as well as information relating to the watching users who watched that game video.

The streaming history information 115 includes the participating user information, watching user information, game history information, and chat information. The participating user information identifies the host user and the guest user who participated in the game. The watching user information is information relating to the watching users who watched that game video. For example, the watching user information is a number of watching users. The number of watching users includes a number of users who were watching when the game started, a number of users who were watching when the game ended, a cumulative number of users including watching users who stopped watching during the game and watching users who started watching in the middle of the stream, and the like. The game history information includes information such as the items 58 used in the game and the set number of medals when the first reward condition or the second reward condition was met. The chat information is text data that indicates the content of in-game chats that took place during the photographing period, and the like. The chat information may indicate the content of chats between streaming users. The chat information may indicate the content of messages transmitted by watching users. The streaming history information 115 may also include a date and time of the stream and a stream time from a time when the stream was started to a time it was ended.

When a user operation to display the object display screen 105 of the picture guide is received by the output control unit 52, the output control unit 52 transmits a viewing request to request data for displaying the object display screen 105 to the API server 14 and the multi-game server 13, along with the object ID of the designated moving object 57. The API server 14 transmits information relating to the picture guide to the streaming user device 21. The multi-game server 13 transmits the streaming history information 115 to the streaming user device 21. The output control unit 52 displays the object display screen 105 of the picture guide based on the received information relating to the picture guide and the streaming history information 115.

The streaming user device 21 may be configured to receive at least one of the information relating to the picture guide and the streaming history information 115 from the real-time server 12. The real-time server 12 receives these types of information from the API server 14 and the multi-game server 13. The streaming user device 21 may be configured to receive the information relating to the picture guide and the streaming history information 115 from the API server 14. In this case, the API server 14 acquires the streaming history information 115 from the multi-game server 13. Then, the API server 14 transmits the information relating to the picture guide and the streaming history information 115 to the streaming user device 21. The streaming user device 21 may be configured to receive the information relating to the picture guide and the streaming history information 115 from the multi-game server 13. In this case, the multi-game server 13 acquires the information relating to the picture guide from the API server 14. Then, the multi-game server 13 transmits the information relating to the picture guide and the streaming history information 115 to the streaming user device 21.

FIG. 21 is the object display screen 105 of the picture guide. The image of the moving object 57 illustrated in FIG. 21 is an image of the special object 106. For example, the output control unit 52 may include, as the streaming conditions, user identification information 116, a number of viewers who watched the game video 111, game history information 112 (fishing information), a chat display button 113, and a photographed image 114. The user identification information 116 is icons or usernames of the streaming users 70 who participated in the game. When a user has selected an icon, the output control unit 52 displays detailed information of the streaming users 70 corresponding to the icon. The game history information 112 (fishing information) includes information such as the items 58 used in the game and the set number of medals when the second in-game action was successful.

Furthermore, when the chat display button 113 is selected, the output control unit 52 displays the chat content during the photographing period. The displayed chat content is not limited to chats during the photographing period and may also include chat content from a period until a prescribed amount of time prior (past) to the time when the photographing period was started and chat content from a period until a prescribed amount of time after the photographing period is ended. Thus, it is possible to record conversations between the streaming user 70 during the match against the special object 106 or after the photographing has ended. Furthermore, when the number of chat posts, the number of characters included in the chat content, or the like is high, a chat display screen (not illustrated) may be displayed separately from the object display screen 105 when the chat display button 113 is selected. Thus, it is possible to make the chat content easier to view, even when the number of chats or the like is high.

The photographed image 114 is displayed on the object display screen 105 when the moving object 57 is a special object. Note that the photographed image 114 is not displayed on the object display screen 105 of normal moving objects. The photographed image 114 is an image photographed during the special cutscene. Thus, by recording the playing status of the game on the object display screen 105 in this manner, users can refer to the playing status of the game when playing the game. Also, by recording the participating users, chats, and photographed image 114 in advance, it is possible to keep a record of communication of the other streaming users 70.

According to the second embodiment, it is possible to obtain the following effects in addition to the effects described in (1-1) through (1-10) of the first embodiment.

(2-1) The output control unit 52 associates the streaming conditions from when a streaming user 70 acquired the moving object 57 with the acquired moving object 57 and displays such in the picture guide of said streaming user 70. Thus, the streaming user 70 can check the streaming conditions from when the moving object 57 was acquired.

(2-2) The output control unit 52 displays information relating to the watching user and information relating to the other streaming users 70 who participated in the game in the picture guide as the streaming conditions. Thus, the streaming user 70 can ascertain the number of watching users who watched the scene of the moving object 57 being acquired, and the like. Furthermore, the streaming user 70 can ascertain the number of other streaming users 70 from when the moving object 57 was acquired, and the like.

(2-3) The output control unit 52 displays the conditions from when the streaming users 70 played the game on the object display screen 105 in the picture guide as the streaming conditions. Thus, it is possible to check conditions suitable for acquiring the moving object 57.

(2-4) The output control unit 52 displays the chat content of the photographing period in the picture guide as the streaming conditions. Thus, the streaming users 70 can check communication between the streaming users 70 that took place when the moving object 57 was acquired.

(2-5) The output control unit 52 makes the picture guide of the host user viewable only while the watching users are watching the game video. Thus, it is possible to restrict viewing of detailed information relating to the streaming conditions.

Each of the foregoing embodiments can be implemented while modified as follows. The foregoing embodiments and the following modifications can be implemented in combination insofar as they are not technically inconsistent.

<User>

In each of the foregoing embodiments, streaming user 70 means a user on the end transmitting at least one of information relating to video and information relating to audio. For example, the streaming user 70 is a user executing video streaming alone or collaborative streaming in which multiple people can participate. In some embodiments, the streaming user 70 may be a user who hosts or holds a video chat or voice chat for which multiple people can do at least one of participating and watching or an event (party or the like) in a virtual space for which multiple people can do at least one of participating and watching. In other words, the streaming user 70 can also be rephrased as the host user, a hosting user, or a holding user.

Conversely, watching user means a user on the end receiving at least one of information relating to video and information relating to audio. However, the watching user may not only receive the foregoing information but also react to it. For example, the watching user is a user who watches a video stream or a collaborative stream. In some embodiments, the watching user may be a user who performs at least one of participating in or watching a video chat, a voice chat, or an event. Thus, the watching user can also be rephrased as the guest user 70G, a participating user, a listener, a spectating user, a supporting user, or the like.

In the foregoing embodiments, the host user is configured to start the streaming of the video in a group that includes users assembled in a lobby. Instead, the game video may be streamed when users who are not currently streaming meet each other in a game field included within a virtual space. In this case, a first user of the plurality of users uses the user device 20 to transmit a streaming request to the multi-game server 13 or another server. Similarly, a second user may also use the user device 20 to transmit a streaming request to the multi-game server 13 or another server. In this aspect, the first user and the second user are the host user in the foregoing embodiments. Furthermore, each user device 20 also sets up a virtual camera corresponding to the avatar object 60 of the user using the applicable user device 20. The user device 20 used by the first user sets up a virtual camera for imaging focused on the avatar object 60 of the first user. The user device 20 used by the second user sets up a virtual camera for imaging focused on the avatar object 60 of the second user. According to this aspect, it is possible to stream video due to incidental opportunities, and thus it is possible to expect an increase in the number of times videos are streamed. It is also easier to stream videos.

<Collaborative Streaming>

In each of the foregoing embodiments, co-starring users are able to participate in collaborative streams when a streaming user 70 allows participation or a streaming user 70 transmits a participation invite to another user. Instead of or in addition to this, attribute information (level, parameters, or the like) of a user meeting a prescribed condition may be used as a participation condition of a game.

As one aspect, the multi-game server 13 determines whether the attribute information of a watching user meets the prescribed conditions. Also, the determination results are transmitted to the watching user device 22 of the watching user whose attribute conditions meet the prescribed conditions. Based on the determination result that the attribute conditions meet the prescribed conditions, the watching user device 22 displays operation objects such as an operation button for indicating an intent to participate in the game. When the watching user device 22 accepts an operation of the operation object, it transmits a participation request to the real-time server 12 and the like. When the real-time server 12 receives a participation request, it transmits to the streaming user device 21 the participation request and the user ID of the watching user who transmitted the participation request.

As another aspect, an aspect wherein a streaming user 70 transmits a participation invite to another user will be described. In this aspect, the multi-game server 13 may be configured to determine in advance whether the attribute information of each user meets the prescribed conditions. The users subject to determination may be, for example, friend users who have performed mutual authentication with the streaming user 70. The users subject to determination may be, for example, users who belong to the same group (group of a group chat or guild for playing the game) as the streaming user 70. The users subject to determination may be all users who have installed the video application or all users who have registered as users with a video streaming service.

The multi-game server 13 transmits the determination results of whether the attribute information meets the prescribed conditions to the user device 20 in advance. Furthermore, the multi-game server 13 transmits the participation invite received from the streaming user 70 to each user device 20. The user device 20 displays an operation object for participating in the game based on the determination results received in advance. In other words, the user device 20 displays the operation object when it is determined that the attribute information of the user meets the prescribed conditions based on the determination results, whereas it does not display the operation object when it is determined that the attribute information of the user does not meet the prescribed conditions. In some embodiments, when the multi-game server 13 receives a participation invite from the user device 20 used by the streaming user 70, a user whose user attribute information meets the prescribed conditions is selected from among the users subject to determination. Also, the participation invite is transmitted only to the user device 20 used by the selected user. When the user device 20 receives a participation invite, it displays an operation object for participating in the game.

<Game Parameter>

In each of the foregoing embodiments, the game parameter used for the set value, the individual reward, and the group reward is the number of medals. As described above, the game parameter may be another parameter. When the game parameter is a match parameter pertaining to the avatar object 60, such as attack power, defense power, combat power, or physical strength, these match parameters may be used to conduct a match in the second stage. Furthermore, game parameters may be of a plurality of types. The user designates a game parameter to act as the set value from among the plurality of types of game parameters. When a user successfully performs the second in-game action, the real-time server 12 grants a reward of the same game parameter as the consumed game parameter. Thus, it is possible to increase variation in the game.

<Level>

The user information 35 may include a level of the user. The first progress unit 40 and the second progress unit 45 increase the level of the user according to a play history of the game. For example, the level of the user may be increased the larger the set value total is. In one example, the level of the user may be increased according to at least one of a number of moving objects acquired, a number of games played, and time spent playing games.

Furthermore, the first progress unit 40 and the second progress unit 45 may change the values of various parameters according to the level as follows.

For example, when a maximum set value (maximum BET amount), which is an upper limit of the set value (BET amount), is predetermined, the maximum set value may be increased according to the level. For example, a maximum set value of "10,000" may be set for "Level 1" and "15,000" for "Level 2."

For example, an initial value of the set value set when starting the game may be increased according to the level.

For example, an increase multiplier of the group parameter may be changed according to the level. Specifically, as illustrated in FIG. 22, when the set value is the same and the level is different, the increase multiplier for the group parameter may be reduced as the level increases. When the level is the same, the increase multiplier increases as the set value increases. Furthermore, in the table in FIG. 20, the maximum set value increases as the level increases. Thus, it is possible to prevent the difference between the game parameters granted to higher level users and the game parameters granted to lower level users from being excessive. As a result, it is possible to favorably maintain a game balance. Note that by adjusting the value of the increase multiplier, it is possible to increase the increase multiplier of the group parameter as the level increases.

<Possessed Quantity>

In the foregoing embodiments, the possessed quantity returns to the initial value when the game ends. In some embodiments, the possessed quantity may be maintained even after the game has ended (moneybox). For example, the possessed medals, which is the possessed quantity, may be used within games playable by the player. Furthermore, the possessed quantity may have a maximum value set. In this case, the game parameter cannot exceed the maximum value. The maximum value may be higher according to the level described above.

<Set Value Specification Unit>

The set value specification unit 41 subtracts the set value from the possessed quantity when a prescribed in-game action, such as performing a cast, is performed, but the set value may be subtracted from the prescribed value at other times. For example, the set value may be subtracted from the possessed quantity when the match condition is met (game process P2).

<First Progress Unit>

In each of the foregoing embodiments, the first progress unit 40 is configured to conduct a lottery for success and failure of the second in-game action based on the success rate. In addition to this, for example, the first progress unit 40 may determine that a streaming user 70 has successfully completed the second in-game action when the parameter associated with the streaming user 70 is greater than the parameter associated with the moving object 57. In other words, the lottery process does not need to be performed when determining the success or failure of the second in-game action.

In each of the foregoing embodiments, the first progress unit 40 subtracts the set value (for example, consumed medals) from the possessed quantity associated with the streaming user when the first in-game action is executed. Instead, the set value may be subtracted from the possessed quantity associated with the streaming user only when the second in-game action is executed in succession with the first in-game action.

The first progress unit 40 is configured to determine the success rate based on an acquisition probability associated with the moving object 57 and the set number of medals, which is the set value set by the streaming user, and to conduct a lottery to determine whether the second in-game action will be successful based on the success rate. Instead of or in addition to this, the success rate may be determined based on something other than the set value. For example, the success rate may be based on the rarity of the moving object 57. The success rate may also be determined by a time of day at which the game is run.

In each of the foregoing embodiments, the specific example of the game is a fishing game, but the information processing system 11 may also be configured to stream videos of other games. For example, it may be a role-playing game, a shooting game, an action game, a racing game, a fighting game, a life simulation game, a romance simulation game, a puzzle game, a card game, a sports game, a rhythm game, or the like.

<Determination Unit>

The determination unit 44 determines the amount of increase in the group parameter according to the set value. Instead of or in addition to this, the amount of increase in the group parameter may be constant regardless of the set value. In some embodiments, the amount of increase in the group parameter may increase with time that has passed from the time the first stage was started. The amount of increase in the group parameter may increase as the number of casts increases.

The determination unit 44 determines that the mission of the group has been accomplished when the group parameter reaches a prescribed value. Instead of or in addition to this, the mission of the group may be determined to have been accomplished when the total number of items collected by each user belonging to the group has reached a prescribed number. In some embodiments, the mission of the group may be determined to have been accomplished when the number of matches or number of defeated match opponents of each user belonging to the group has reached a prescribed number.

<First Reward Granting Unit>

The first reward granting unit 43 may grant an individual reward to a streaming user 70 upon successful completion of the first in-game action. The first in-game action may be any in-game action based on an operation of the streaming user 70.

The first reward granting unit 43 is configured to grant the individual reward according to the set value and odds. Instead of or in addition to this, the first reward granting unit 43 may be configured to determine the value of the game parameter acting as the individual reward without using the odds. In this case, the first reward granting unit 43 increases the value of the game parameter the greater the set value is. The first reward granting unit 43 may also be configured to determine the individual reward by using the set value and, of the parameters associated with the moving object 57, the value of the game parameter acting as the individual reward by using something other than the odds. For example, a basic reward (for example, number of medals) associated with the moving object 57 may be used to determine the individual reward.

In each of the foregoing embodiments, the multiplier setting unit 42 is configured to conduct a lottery for the boost multiplier. A boost multiplier associated with a threshold value may also be set when the set value total reaches the threshold value. Furthermore, the multiplier setting unit 42 is configured to determine whether to update the boost multiplier when the set value total reaches the threshold value. The multiplier setting unit 42 may also be configured to update the boost multiplier each time the set value is subtracted from the possessed quantity. In some embodiments, the multiplier setting unit 42 may be configured to update the boost multiplier when the number of times the set value is subtracted from the possessed quantity has reached a threshold value. In some embodiments, the multiplier setting unit 42 may update the boost multiplier based on a parameter associated with the moving object 57 when a streaming user successfully performs an in-game action such as the second in-game action.

In each of the foregoing embodiments, the second stage is run based on the boost multiplier determined in the first stage. Instead of or in addition to this, the boost multiplier may be changed in the second stage as well. In this case, the second progress unit 45 may be configured to change the boost multiplier according to the group reward or individual reward acquired by the streaming user 70.

In each of the foregoing embodiments, the odds are set to a multiplier of 1× or more or a multiplier of less than 1× as the odds of the moving object 57. Instead, the odds of the moving object 57 may have a multiplier of 1× or more or exceeding 1× set.

<Second Progress Unit>

The second progress unit 45 is configured to not subtract the number of medals set by the streaming user from the possessed number of medals of the streaming user 70 when the cast is executed. Instead of or in addition to this, the set value may be subtracted from the possessed quantity when an in-game action such as a cast is executed. At this time, the set value of the second stage may be greater than the set value of the first stage. In some instances, the set value of the first stage may be greater than the set value of the second stage.

The second progress unit 45 places special objects and normal objects in the game field 55 as moving objects 57. Instead of or in addition to this, the second progress unit 45 may be configured to place only special objects in the game field 55.

<Second Reward Granting Unit>

The second reward granting unit 46 may grant an individual reward and a group reward to a streaming user 70 upon successful completion of the first in-game action. The first in-game action may be any in-game action based on an operation of the streaming user 70.

The second reward granting unit 46 is configured to grant the group reward according to the odds and the boost multiplier. Instead of or in addition to this, the second reward granting unit 46 may be configured to grant the group reward based on the boost multiplier and parameters other than odds associated with the match opponent. The parameters other than odds are the basic reward (for example, number of medals), rarity, and the like associated with the moving object 57.

In the foregoing embodiments, the second reward granting unit 46 grants the group reward to the streaming users 70 according to the boost multiplier associated with each streaming user 70. The second reward granting unit 46 may also be configured to grant a fixed group reward to the streaming users 70.

In each of the foregoing embodiments, the second reward granting unit 46 is configured to grant the group reward to all of the streaming users 70 that are users belonging to the group. Instead of or in addition to this, the group reward may be granted to some of the users belonging to the group. A plurality of users to be granted the group reward may or may not include users who have met the second reward condition. In some embodiments, a user to be granted the group reward may be one user belonging to the group. The plurality of users to be granted the group reward may be selected at random or may be in order of lowest (or order of highest) for a parameter, such as the number of medals. By configuring as such, it is possible to give the game randomness in the second stage.

In each of the foregoing embodiments, the group reward is granted to each user belonging to the group when one user belonging to the group meets the second reward condition. The group reward may be granted to each user belonging to the group when a prescribed number of two or more users belonging to the group meet the second reward condition. For example, the second reward granting unit 46 totals the number of users who have met the second reward condition. Then, when it is determined that three users have met the second reward condition, the cumulative number may be reset and the group reward be granted to each user.

<Special Cutscene>

In the special cutscene process, avatar objects 60 corresponding to the watching users who watch the game video may be displayed in addition to the avatar objects 60 corresponding to the streaming users 70. At this time, the output control unit 52 may render the avatar objects 60 corresponding to the streaming users 70 and the avatar objects 60 corresponding to the watching users in different modes of display. Specifically, the avatar objects 60 corresponding to the watching users may be displayed smaller. In some embodiments, the output control unit 52 may be configured to use motion data corresponding to the streaming users 70 to render the avatar objects 60 corresponding to those streaming users 70, while rendering the avatar objects 60 corresponding to the watching users without using motion data.

In the special cutscene process, the output control unit 52 may be configured to display line drawings input by the streaming users 70, stamps (designs and character images) selected by the streaming users 70, and the like on the photographed image.

Each user may set the avatar object 60 to any height. Thus, the output control unit 52 may be configured to automatically adjust the height of the virtual camera according to the height of the plurality of avatar objects 60 to be photographed during the photographing period. Specifically, the output control unit 52 specifies a shortest avatar object 60 and a tallest avatar object 60 from among the plurality of avatar objects 60 to be photographed. Also, the height of the virtual camera is adjusted such that these avatar objects 60 are included in the photographing area. In some instances, the output control unit 52 may adjust the height position of the shortest avatar object 60 or tallest avatar object 60 to reduce the apparent height difference of each avatar object 60, while keeping the height of the virtual camera constant. By adjusting the height of the virtual camera according to the height of the avatar object 60 in this way, the user can easily take a commemorative photograph without any difficulty, even when the user is not familiar with operation of the virtual camera.

<Picture Guide>

In one embodiment, when a streaming user 70 has met the second reward condition, the photographed image 114 is recorded in association with the picture guide of that streaming user 70. At this time, the photographed image 114 may be recorded in association with the picture guide of a streaming user 70 (hereinafter referred to as second streaming user) other than the streaming user 70 who met the second reward condition (hereinafter referred to as first streaming user). In this case, the photographed image 114 is recorded in the picture guide of the second streaming user 70 in association with the same moving object 57 as the moving object 57 acquired by the first streaming user 70. When the second streaming user 70 has not acquired that moving object 57, the unacquired object display section 102B is displayed. The photographed image 114 recorded in association with the moving object 57 that has not been acquired may be deleted when a prescribed period has passed from the time it was recorded. When the photographed image 114 is recorded in association with a moving object 57 that has not been acquired and the second streaming user 70 newly meets the second reward condition, the already recorded photographed image 114 may be overwritten with the photographed image 114 photographed at that time.

Furthermore, the photographed images 114 associated with acquired moving objects 57 and unacquired moving objects 57 may be given an upper limit for each acquired object. The upper limit is the number of photographed images 114, the amount of data (data size) that is the total size of the data from a plurality of photographed images 114, or the like. When the number of photographed images 114 associated with a moving object and the total amount of data reaches the upper limit due to the acquisition of a new photographed image 114, the user device 20 or the API server 14 performs a deletion process to delete at least one of the plurality of photographed images 114. The deletion process may, for example, automatically delete a prescribed number of photographed images 114 in order of earliest (oldest) recorded date and time. In some embodiments, the deletion process may be a process of deleting images selected by the user. At this time, the user device 20 may display a notice on the display 32 informing the user that the upper limit has been reached. Said notice may display a list of the photographed images 114 in addition to a message such as "Storage full! Which image should be deleted?" Then, one or a plurality of photographed images 114 selected by the user are deleted.

The user device 20 or the API server 14 may be configured to determine whether the total number totaling the photographed images 114 associated with each of the unacquired moving objects 57 or the total amount of data has reached the upper limit. Specifically, in one example, 4 photographed images 114 are associated with an unacquired "moving object A" and 6 captured images 114 are associated with an unacquired "moving object B." When a photographed image 114 for the "moving object A," is newly acquired, the user device 20 or the API server 14 determines whether the total number of images to which the new photographed image 114 has been added, which is "11 images," has reached an upper limit number of photographed images 114 (for example, 10 images) associated with the unacquired moving objects 57. Then, when it is determined that the total number of images to which the newly photographed image 114 has been added has reached the upper limit number, the deletion process described above is performed. In this case, the deletion process may automatically delete a photographed image 114 associated with a moving object 57 for which an attribute such as rarity is low. In one example, the deletion process may display photographed images 114 that are candidates for deletion in a prescribed order, such as in order from a lowest value of an attribute such as rarity, on the display 32. Then, when a photographed image 114 is selected, the selected photographed image 114 may be deleted.

In each of the foregoing embodiments, the acquisition condition for moving object 57 is that the streaming user 70 successfully performed the second in-game action, upon which the moving object is registered to the picture guide. The second in-game action may be any action executed in the game and is not limited to a cast. It may be changed according to the game. Furthermore, the moving object may be registered to the picture guide when the first in-game action is successful.

In each of the foregoing embodiments, the output control unit 52 displays in the picture guide screen 100 as the acquired object display section 102A indicating the moving object 57 acquired by that streaming user 70. Instead of or in addition to this, a moving object 57 that has not yet been acquired by a streaming user 70 in the game in which that streaming user 70 participated but has been acquired by another streaming user 70 belonging to the group may be displayed in a different mode of display (first mode of display) from the acquired object display section 102A. When that streaming user 70 has acquired the moving object, the output control unit 52 displays such as the acquired object display section 102A, which is the second mode of display.

In each of the foregoing embodiments, the game fields 55 are opened in a predetermined order. Instead of or in addition to this, the user may be able to select the opened game fields 55. A next game field 55 may be opened when a level associated with the user reaches a certain value. In one example, when an initial level is "1", and when conditions for increasing the level are met, the level rises to "2", "3," and so on. For example, in this case, when the level is "1 to 9," a "game field A" and a "game field B" are opened.

Furthermore, when the level is "10 to 19," a "game field C" and a "game field D" are opened in addition to the "game field A" and the "game field B." According to this aspect, users can develop a strategy prioritizing playing open game fields with which they are highly compatible, then playing game fields that they dislike.

In each of the foregoing embodiments, the watching users can only view the picture guide when the host user 70H has their own picture guide displayed on the user device 20. Instead of or in addition to this, the output control unit 52 may, in the lobby screen, display the picture guide display button 88A so as to be selectable by the watching users and the streaming user 70. When the user device 20 accepts an operation of the picture guide display button 88A, it transmits a viewing request to the API server 14 together with a user ID or room identification information of the host user 70H. When a viewing request is received, the API server 14 acquires information for displaying the moving objects 57 associated with the host user 70H based on the user ID or room identification information and transmits this to the user device 20 that transmitted the viewing request. Thus, the watching users may view the picture guide of the host user 70H at any time before the game starts.

In some embodiments, the output control unit 52 may be configured to display the picture guide display button 88A in association with each avatar object 60 displayed on the lobby screen. The streaming user devices 21 and the watching user devices 22 may display not only the picture guide screen 100 of the host user, but also the picture guide screen 100 of the guest user 70G based on an operation of the guest user 70G or the host user 70H. In this case, the guest user 70G operates an operation object for sharing the picture guide displayed on the lobby screen. When the streaming user device 21 of the guest user 70G accepts the operation, it transmits a viewing request to the API server 14 to view the room identification information, the user ID of that guest user 70G, and the information of the moving object 57 acquired in the game that has ended. When the API server 14 receives a viewing request or the like, it transmits the room identification information, the user ID of the guest user 70G, and the information on the moving object 57 acquired in the game that has ended to the multi-game server 13. The multi-game server 13 transmits the information of the moving object 57 to the streaming user devices 21 of streaming users other than that guest user 70G and to the watching user devices 22. Thus, it is possible for the streaming user devices 21 and the watching user devices 22 to view the picture guide screen 100 of the guest user 70G. When that guest user 70G transmits a viewing end request to the multi-game server 13 by operating an operation object, the multi-game server 13 transmits the viewing end request to the streaming user devices 21 of streaming users other than that guest user 70G and to the watching user devices 22. Accordingly, when the game ends, each user can simultaneously view the picture guide not only of the host user 70H, but also of the guest user 70G. The multi-game server 13 may display the picture guide of each of the moving objects 57 acquired by the streaming users 70 who participated in the game on the screen so as to be viewable by the users. When a user selects an icon for one of the picture guides, the corresponding picture guide screen 100 may be displayed.

Furthermore, the user may be able to view the picture guide while the object display screen is available for viewing in a period outside of the watching period in which the video is watched. For example, when a home screen associated with each user is viewable outside of the watching period, the user device 20 used by a first user may display the picture guide display button 88A on the home of a second user. Also, when the user device 20 accepts the operation of the picture guide display button 88A, it displays the picture guide screen 100 associated with the second user. The user device 20 then displays the object display screen 105 by accepting the operation of the object display section 102 of the picture guide screen 100. According to this aspect, the first user can ascertain a play history and a proficiency of the second user by referencing the picture guide of the second user.

Furthermore, a time at which a watching user or a streaming user 70 can view the picture guide may be provided not only in the lobby screen, but also while the game is in progress. For example, the output control unit 52 may be configured to display the picture guide display button 88A in the first stage and the second stage so as to be selectable by the watching users and the streaming users 70. Even in this case, the picture guide display button 88A may be displayed in association with each avatar object 60. In other words, the watching users may view the picture guides respectively associated with each of the streaming users 70 participating in the game by selecting the picture guide display button 88A.

Furthermore, in an aspect wherein the watching users view the picture guides of the host user and the like while the lobby screen is displayed or at another time, the user device 20 may be configured to forcibly end the display of the picture guide when a viewing end condition is met. For example, the view end condition is a condition relating to the game. Specifically, it is moving from the lobby to the game field to start the game. In this case, when the watching user device 22 receives data indicating the start of the game from the real-time server 12, it determines that viewing of the picture guide will be ended. In one case, the viewing end condition is moving to the second stage by fulfilling the mission of the group in the game being run. When the watching user device 22 receives data indicating the start of the second stage from the real-time server 12, it determines that viewing of the picture guide will be ended. In some embodiments, the viewing end condition is receiving a message corresponding to the end of viewing from the host user. Based on the prescribed operation of the host user, the host user device 21H transmits a message such as "The game will start soon" to the multi-game server 13 and the like. A command indicating the end of viewing (viewing end request) is associated with this message. When the watching user device 22 receives this message from the multi-game server 13, it determines that viewing of the picture guide will be ended.

<Special Reward>

The first reward granting unit 43 and the second reward granting unit 46 may grant a special reward when a special reward condition is met. The special reward condition is acquiring a special object, a user reaching a prescribed level, or the like. The special reward may be an item that can be used within the video application or may be other game media. For example, the special reward is a wearable object, such as a hat, that can be worn by the avatar object 60. In one example, the special reward is a moving body, such as a ship, that can be displayed on the game field 55, or texture data used to display a moving body. The texture data may decorate the moving body.

<Information Processing System>

The sensor unit 28 acquires detection data detected from changes in the facial expressions of the user and movement of the upper body and the like of the user, but at least one of these may be used. Furthermore, the sensor unit 28 may, in addition to or instead of the changes in the facial expressions of the user and the movement of the upper body and the like, acquire detection data detected from movements of other parts.

The virtual space displayed in the video may be an augmented reality (AR: augmented reality) space. For example, animations of avatar objects, gift objects, and the like that are based on data transmitted from the streaming user device 21 may be superimposed on an image of the real world photographed by a camera of the watching user device 22. In one example, the streaming user device 21 may be configured to generate a video by superimposing the animations of the avatar objects, gift objects, and the like on an image of the real world photographed by its own camera, encode the video, and transmit it to the multi-game server 13.

In each of the foregoing embodiments, the user device 20 is an information processing device such as a smartphone, a mobile telephone, a tablet device, a personal computer, a console gaming machine, a wearable computer such as a head-mounted display, or the like. Instead, the information processing system may be a system provided in a studio for video streaming. The information processing system has an information processing device, a server, a sensor unit worn on the body of the streaming user 70, a tracking system to detect the location of the sensor unit, an operation unit, a speaker, a display, and the like. The tracking system may be provided with a multi-axis laser emitter that emits a pulsed laser beam for synchronization. The sensor unit is provided with a sensor that detects the laser beam and detects its own location and incline while synchronizing with the synchronization pulse.

The control unit 25 of the user device 20 is configured to function as the output control unit 52 and the transmission unit 53 that acts as the first output control unit, the second output control unit, the first reward display unit and the second reward control unit by running the video application. At least one of these may be executed by the real-time server 12, the multi-game server 13, or another device constituting the information processing system 11. Furthermore, the control unit 25 of the real-time server 12 is configured to function as the first progress unit, the set value specification unit, the first reward granting unit, the determination unit, the second progress unit, and the second reward granting unit. At least one of these may be executed by the user device 20, the multi-game server 13, the API server 14, or another device constituting the information processing system 11.

The real-time server 12 corresponds to the game management unit (game management server), and the multi-game server 13 corresponds to the stream management unit (stream management server). The real-time server 12 and the multi-game server 13 may perform server functions by executing each process as the respective program is run, and the functions need not necessarily be respectively assigned to two devices. In other words, the real-time server 12 and the multi-game server 13 may be configured from a single server or may be configured from a plurality of servers, being two or more. Similarly, the real-time server 12, the multi-game server 13, and the API server 14 may be configured from a single server. Furthermore, the multi-game server 13 and the API server 14 may be configured from a single server. Moreover, the real-time server 12 and the API server 14 may be configured from a single server.

Next, technical ideas that can be grasped from the foregoing embodiments and other examples are added below.

(1) A game control device, comprising: first progress processing circuitry configured to, in a first stage, progress a game based on an operation of a user belonging to a group; set value specification processing circuitry configured to specify, as a set value, a value of a game parameter set by the user; first reward granting processing circuitry configured to, when a playing status of the user meets a first reward condition in the first stage, specify a value of the game parameter to be granted as an individual reward according to the set value and updating a possessed quantity, which is a value of the game parameter associated with the user, based on the individual reward; determination processing circuitry configured to determine whether a mission of the group has been accomplished based on the playing status of the user in the first stage; second progress processing circuitry configured to progress the game in a second stage when the mission of the group is accomplished; and second reward granting processing circuitry configured to, when users belonging to the group have met a second reward condition in the second stage, specify at least one of the users belonging to the group as users to be granted a group reward, specify a value of the parameter to be granted as the group reward to each of the users to be granted the group reward, and updating the possessed quantities of the users to be granted the group reward.

(2) The game control device according to (1), further comprising multiplier setting processing circuitry configured to update a multiplier associated with the user according to the set value set by the user, wherein the second reward granting processing circuitry is configured to change the group reward granted to each of the users according to the multiplier associated with the users to be granted the group reward.

(3) The game control device according to (1) to (2), wherein the second progress processing circuitry is configured to associate a moving object with the user when the second reward condition relating to the moving object is met, and the second reward granting processing circuitry is configured to determine the group reward according to the multiplier and a value of a parameter associated with the moving object.

(4) The game control device according to (1) to (3), wherein the first progress processing circuitry is configured to reduce the possessed quantity by the set value when the user performs a prescribed in-game action in the first stage.

(5) The game control device according to (1) to (4), wherein, when the game is interrupted before the game is ended in the second stage, the second progress processing circuitry is configured to record the multiplier associated with the user.

(6) The game control device according to (1) to (5), wherein the first progress processing circuitry is configured to update a group parameter associated with the group when the set value set by the user is used to update the possessed quantity of said user, and the determination processing circuitry is configured to determine that the mission of the group is accomplished when the group parameter has reached a prescribed value.

(7) The game control device according to (1) to (6), wherein the second progress processing circuitry is configured to reduce the group parameter according to time and to end the second stage when the group parameter reaches a lower limit.

(8) The game control device according to (1) to (7), wherein the first progress processing circuitry is configured to determine by lottery whether the playing status of the users meets the first reward condition.

(9) The game control device according to (1) to (8), wherein the second progress processing circuitry is configured to determine by lottery whether the playing status of the users meets the second reward condition.

(10) The game control device according to (1) to (9), wherein the first progress processing circuitry is configured to execute a first in-game action according to operations of the users in a game field in which a plurality of moving objects move, and the first reward granting processing circuitry is configured to determine whether a second in-game action of the user toward the plurality of moving objects in a selectable state according to the first in-game action was successful and determine that the first reward condition has been met when the second in-game action is successful.

(11) The game control device according to (1) to (10), wherein the second progress processing circuitry is configured to execute a first in-game action according to operations of the users in a game field in which a plurality of moving objects move, and the second reward granting processing circuitry is configured to determine whether a second in-game action of the user toward the plurality of moving objects in a selectable state according to the first in-game action was successful and determine that the second reward condition has been met when the second in-game action is successful and a moving object subject to the second in-game action is a special object.

(12) A game control method comprising: progressing, via processing circuitry, a game based on an operation of a user belonging to a group; specifying, via the processing circuitry, as a set value, a value of a game parameter set by the user; specifying, via the processing circuitry, a value of the game parameter to be granted as an individual reward according to the set value and updating a possessed quantity, which is a value of the game parameter associated with said user, based on the individual reward when a playing status of the user meets a first reward condition in the first stage; determining, via the processing circuitry, whether a mission of the group has been accomplished based on the playing status of the user in the first stage; progressing, via the processing circuitry, the game in a second stage when the mission of the group is accomplished; and specifying, via the processing circuitry, at least one of the users belonging to the group as users to be granted a group reward, specifying a value of the parameter to be granted as the group reward to each of the users to be granted the group reward, and updating the possessed quantities of the users to be granted the group reward when the users belonging to the group has met a second reward condition in the second stage.

(13) A non-transitory computer-readable storage medium for storing a program including computer-readable instructions that, when executed by one or a plurality of computers, cause the one or the plurality of computers to perform a method, the method comprising: displaying a game screen in a first stage of a game based on operations of users belonging to a group; transmitting a value of a game parameter set by a user to a server as a set value; displaying a possessed quantity of the user updated using a value of a game parameter granted as an individual reward according to the set value when a playing status of the users has met a first reward condition in the first stage; displaying a game screen of a second stage when a mission of the group has been accomplished; and displaying the possessed quantity of the user updated using a value of the game parameter granted as a group reward when another of the users belonging to the group has met a second reward condition in the second stage.

(14) An information processing method comprising: displaying, via processing circuitry, a game screen in a first stage of a game based on operations of users belonging to a group; transmitting, via the processing circuitry, a value of a game parameter set by a user to a server as a set value; displaying, via the processing circuitry, a possessed quantity of the user updated using a value of a game parameter granted as an individual reward according to the set value when a playing status of the users has met a first reward condition in the first stage; displaying, via the processing circuitry, a game screen of a second stage when a mission of the group has been accomplished; and displaying, via the processing circuitry, the possessed quantity of the user updated using a value of the game parameter granted as a group reward when another of the users belonging to the group has met a second reward condition in the second stage.

(15) A game control system, comprising: first progress unit processing circuitry configured to, in a first stage, progress a game based on an operation of a user belonging to a group; set value specification processing circuitry configured to specify, as a set value, a value of a game parameter set by the user; first reward granting processing circuitry configured to, when a playing status of the user meets a first reward condition in the first stage, specify a value of the game parameter to be granted as an individual reward according to the set value and updating a possessed quantity, which is a value of the game parameter associated with the user, based on the individual reward; determination processing circuitry configured to determine whether a mission of the group has been accomplished based on the playing status of the user in the first stage; second progress processing circuitry configured to progress the game in a second stage when the mission of the group is accomplished; and second reward granting processing circuitry configured to, when users belonging to the group have met a second reward condition in the second stage, specify at least one of the users belonging to the group as users to be granted a group reward, specify a value of the parameter to be granted as the group reward to each of the users to be granted the group reward, and update the possessed quantities of the users to be granted the group reward.

(16) A non-transitory computer-readable storage medium for storing a program including computer-readable instructions that, when executed by one or a plurality of computers, cause the one or the plurality of computers to perform a method, the method comprising displaying a game screen in which an avatar object corresponding to a user is displayed in a first mode of display that does not reflect movements of the user in a game progress period; acquiring detection data detected from movements of the user; starting a photographing period for photographing the avatar object, suspending progress of a game during the photographing period, and displaying the avatar object on a display unit in a second mode of display that uses the detection data to reflect facial expressions of the user when a playing status of the user has met a photographing condition; recording an image including the avatar object based on an operation of the user in a storage unit during the photographing period; ending, when the photographing period has ended, the display of the avatar object in the second mode of display; and starting, when the photographing period has ended, the game progress period to display the game screen including the avatar object in the first mode of display.

(17) The non-transitory computer-readable storage medium according to (16), wherein a plurality of the users can participate in the game, and the displayed avatar object of each of the plurality of the users respectively reflects the facial expressions of each of the plurality of the users in the photographing period when one user from among the plurality of the users has met the photographing condition.

(18) The non-transitory computer-readable storage medium according to (16) to (17), further comprising causing the avatar object to perform a prescribed movement using motion data recorded in the storage unit in advance, based on an operation of the user during the photographing period.

(19) The non-transitory computer-readable storage medium according to (16) to (18), wherein the photographing condition is the user having acquired a prescribed object, and the method further comprising displaying an image recorded during the photographing period in association with an image of the acquired object when the photographing condition has been met.

(20) The non-transitory computer-readable storage medium according to (16) to (19), further comprising changing an angle or position of a virtual camera set up in a game field based on an operation of the user.

(21) The non-transitory computer-readable storage medium according to (16) to (20), further comprising expanding or reducing an imaging area of a virtual camera set up in a game field based on an operation of the user.

(22) An information processing method comprising: displaying, via processing circuitry, a game screen in which an avatar object corresponding to a user is displayed in a first mode of display that does not reflect movements of the user in a game progress period; acquiring, via the processing circuitry, detection data detected from movements of the user; starting, via the processing circuitry, a photographing period for photographing the avatar object; suspending, via the processing circuitry, progress of a game in the photographing period; displaying, via the processing circuitry, the avatar object on a display unit in a second mode of display that uses the detection data to reflect facial expressions of the user when a playing status of the user has met a photographing condition; recording, via the processing circuitry, an image including the avatar object based on an operation of the user in a storage unit during the photographing period; terminating, via the processing circuitry, display of the avatar object in the second mode of display; and displaying, via the processing circuitry, the game screen including the avatar object in the first mode of display when the photographing period has ended.

(23) A game control device comprising: game progress processing circuitry configured to progress a game in which an avatar object corresponding to a user is displayed in a first mode of display that does not reflect an action of the user in a game progress period and determination processing circuitry configured to, when a playing status of the user has met a photographing condition, transmit to a user device a start request for a photographing period, which is a period during which the game progress is suspended and detection data detected from a movement of the user is used to display the avatar object in a second mode of display reflecting the movement of the user, wherein the game progress processing circuitry is configured to, when the photographing period has ended, end display of the avatar object in the second mode of display and start progress of the game.

(24) A game control method comprising: progressing, via processing circuitry, a game that uses an avatar object corresponding to a user in a game progress period; transmitting, via the processing circuitry, to a user device a start request for a photographing period, which is a period during which game progress is suspended and detection data detected from a movement of the user is used to display the avatar object in a second mode of display reflecting the movement of the user when a playing status of the user has met a photographing condition; and terminating, via the processing circuitry, display of the avatar object using the detection data and starting the game process when the photographing period has ended.

(25) A non-transitory computer-readable storage medium for storing a program including computer-readable instructions that, when executed by one or a plurality of computers, cause the one or the plurality of computers to perform a method, the method comprising: displaying a screen of a game to be played by a user on a display unit; transmitting data for displaying a video of the game to other devices; accepting an operation of the user to view an object acquired in the game; and displaying an object display screen displaying, in association with each other, the object acquired in the game and a photographed image from when the object was acquired when an operation of the user is accepted.

(26) A non-transitory computer-readable storage medium for storing a program including computer-readable instructions that, when executed by one or a plurality of computers, cause the one or the plurality of computers to perform a method, the method comprising: displaying a screen of a game to be played by a user on a display unit; transmitting data for displaying a video of the game to other devices; accepting an operation of the user to view an object acquired in the game; and outputting an object display screen displaying, in association with each other, the object acquired in the game and a number of the other devices on which the video based on the data for displaying the video of the game is displayed when the operation of the user is accepted.

(27) The non-transitory computer-readable storage medium according to (25) to (26), further comprising displaying, on the object display screen, information relating to the other devices on which the video based on the data for displaying the video of the game is displayed on the other devices.

(28) The non-transitory computer-readable storage medium according to (25) to (27), further comprising displaying conditions from when the user played the game on the object display screen.

(29) The non-transitory computer-readable storage medium according to (25) to (28), further comprising displaying a group chat including other users associated with other devices on which the video based on the data for displaying the video of the game is displayed on the object display screen.

(30) The non-transitory computer-readable storage medium according to (25) to (29), wherein the game is a multiplayer game that can be played by a plurality of users simultaneously, the method further comprising displaying information relating to the plurality of users on the object display screen.

(31) The non-transitory computer-readable storage medium according to (25) to (30), further comprising receiving data for displaying the video of the game transmitted from a user device; and configuring the object display screen to be displayed only while displaying the video of the game.

(32) The non-transitory computer-readable storage medium according to (25) to (31), further comprising receiving data for displaying the video of the game transmitted from a user device; and configuring the object display screen to be displayed even in a period other than a watching period in which the video of the game is displayed.

(33) The non-transitory computer-readable storage medium according to (25) to (32), wherein the game is a multiplayer game that can be played by a plurality of users simultaneously and in which a game field is respectively associated with each user, the method further comprising transmitting game progress data based on an operation of a first user, who is a user using a user device, to a game management server for managing progress of the game; progressing the game in a game field associated with a second user different from the first user among the plurality of users; and displaying the object display screen of the acquired object when the first user meets an acquisition condition of the object, regardless of whether the game field associated with the second user is associated with the first user.

(34) The non-transitory computer-readable storage medium according to (25) to (33), further comprising enabling display of a screen of a game field associated with the user when a list of objects acquired in the game field associated with the user meets prescribed conditions; and displaying the object display screen including the objects acquired by the user in the game field.

(35) The non-transitory computer-readable storage medium according to (25) to (34), further comprising enabling display of a screen of a newly associated game field to the user when a level associated with the user meets prescribed conditions; and displaying the object display screen including the objects acquired by the user in the newly associated game field.

(36) An information processing method, comprising: displaying, via processing circuitry, a screen of a game to be played by a user on a display unit; transmitting, via the processing circuitry, data for displaying a video of the game to other devices used by other users; accepting, via the processing circuitry, an operation of the user to view an object acquired in the game; and displaying, via the processing circuitry, an object display screen displaying, in association with each other, the object acquired in the game and a photographed image from when the object was acquired when the operation of the user is accepted.

(37) An information processing method comprising: displaying, via processing circuitry, a screen of a game to be played by a user on a display unit; transmitting, via the processing circuitry, data for displaying a video of the game to other devices; accepting, via the processing circuitry, an operation of the user to view an object acquired in the game; and outputting, via the processing circuitry, an object display screen displaying, in association with each other, the object acquired in the game and a number of other devices on which the video based on the data for displaying the video of the game is displayed when the operation of the user is accepted.

(38) An information processing system comprising: a user device, a stream management server configured to transmit and receive data for displaying a video, and a game management server configured to manage progress of a game, wherein the user device is provided with first output control processing circuitry configured to display a screen of a game played by the user on a display unit, transmission processing circuitry configured to transmit data for displaying a video of the game to other devices, operation accepting processing circuitry configured to accept an operation of the user to view an object acquired in the game, and second output control processing circuitry configured to display an object display screen displaying, in association with each other, the object acquired in the game and a photographed image from when the object was acquired when an operation of the user is accepted, the management server is configured to transmit the data for displaying the video to the other devices, and the game management server is configured to determine whether a playing status of the user for the game meets an acquisition condition for the object and record the object and the user in association with each other when the acquisition condition is met.

(39) An information processing system comprising: a user device, a stream management server configured to transmit and receive data for displaying a video, and a game management server configured to manage progress of a game, wherein the user device is provided with first output control processing circuitry configured to display a screen of a game played by the user on a display unit, transmission processing circuitry configured to transmit data for displaying a video of the game to other devices, operation accepting processing circuitry configured to accept an operation of the user to view an object acquired in the game, and second output control processing circuitry configured to display an object display screen displaying, in association with each other, the object acquired in the game and a number of the other devices on which the video based on the data for displaying the video of the game is displayed, the management server is configured to transmit the data for displaying the video to the other devices, and the game management server is configured to determine whether a playing status of the user for the game meets an acquisition condition for the object and record the object and the user in association with each other when the acquisition condition is met.

(40) A non-transitory computer-readable storage medium for storing a program including computer-readable instructions that, when executed by one or a plurality of computers, cause the one or the plurality of computers to perform a method, the method comprising: displaying a screen of a game played by a user on a display unit; transmitting data for streaming a video of the game to a stream management server for managing streaming; accepting an operation of the user to view an object acquired in the game; and displaying an object display screen including the object acquired by the user and streaming conditions of the video acquired from the stream management server in response to accepting the operation of the user.

(41) The non-transitory computer-readable storage medium according to (40), wherein displaying the object display screen includes displaying information relating to other users associated with devices receiving the data for streaming the video of the game on the object display screen as the streaming conditions.

(42) The non-transitory computer-readable storage medium according to (40) to (41), wherein displaying the object display screen includes displaying conditions from when the user played the game on the object display screen as the streaming conditions.

(43) The non-transitory computer-readable storage medium according to (40) to (42), wherein displaying the object display screen includes displaying a viewable group chat including other users associated with devices receiving the data for streaming the video of the game on the object display screen as the streaming conditions.

(44) The non-transitory computer-readable storage medium according to (40) to (43), wherein the game is a multiplayer game that can be played by a plurality of users simultaneously, and displaying the object display screen includes displaying information relating to the plurality of users in the multiplayer game on the object display screen as the streaming conditions.

(45) The non-transitory computer-readable storage medium according to (40) to (44), the method further comprising receiving data for displaying a received video of the game streamed from the stream management server, and configuring the object display screen to be displayable only while displaying the received video.

(46) The non-transitory computer-readable storage medium according to (40) to (45), the method further comprising receiving data for displaying a received video of the game streamed from the stream management server and configuring the object display screen to be displayable during a period other than a watching period in which the received video is displayed.

(47) The non-transitory computer-readable storage medium according to (40) to (46), wherein the game is a multiplayer game that can be played by a plurality of users simultaneously and in which a game field is respectively associated with each of the plurality of users, the method further comprising: transmitting game progress data based on an operation of a first user, who is a user using a user device, to the game management server for managing progress of the game, progressing the game in a game field associated with a second user different from the first user among the plurality of users, and displaying the object display screen of the acquired object based on an acquisition condition of the object, regardless of whether the game field associated with the second user is associated with the first user.

(48) The non-transitory computer-readable storage medium according to (40) to (47), the method further comprising enabling display of a screen of the associated game field in response to a list of objects acquired in a game field associated with the user meeting prescribed conditions; and displaying, the object display screen including the objects acquired by the first user in the associated game field.

(49) The non-transitory computer-readable storage medium according to (40) to (48), the method further comprising enabling display of a screen of a newly associated game field to the user in response to a level associated with the user meeting prescribed conditions; and displaying the object display screen including objects acquired by the user in the newly associated game field.

(50) An information processing method, the method comprising: displaying, via first output control processing circuitry, a screen of a game played by a user on a display unit; transmitting, via first transmission processing circuitry, data for streaming a video of the game to a stream management server for managing streaming; accepting, via operation accepting processing circuitry, an operation of the user to view an object acquired in the game; and displaying, via second output control processing circuitry, an object display screen including the object acquired by the user and streaming conditions of the video acquired from the stream management server in response to accepting the operation of the user.

(51) The information processing method according to (50), wherein the game is a multiplayer game that can be played by a plurality of users simultaneously, and the method further comprises displaying the object display screen includes displaying information relating to the plurality of users in the multiplayer game on the object display screen as the streaming conditions.

(52) The information processing method according to (50) to (51), further comprising receiving, via acquisition processing circuitry, data for displaying a received video of the game streamed from the stream management server; and configuring, via the second output control processing circuitry, the object display screen to be displayable only while displaying the received video.

(53) The information processing method according to (50) to (52), further comprising receiving data for displaying a received video of the game streamed from the stream management server; and configuring, via the second output control processing circuitry, the object display screen to be displayable during a period other than a watching period in which the received video is displayed.

(54) The information processing method according to (50) to (53), wherein the game is a multiplayer game that can be played by a plurality of users simultaneously and in which a game field is respectively associated with each of the plurality of users, the information processing method further comprising: transmitting, via second transmission processing circuitry, game progress data based on an operation of a first user, who is a user using a user device, to a game management server for managing progress of the game; progressing, via the first output control processing circuitry, the game in a game field associated with a second user different from the first user among the plurality of users; and displaying, via the second output control processing circuitry, the object display screen of the acquired object based on an acquisition condition of the object, regardless of whether the game field associated with the second user is associated with the first user.

(55) An information processing system, comprising: a user device, a stream management server configured to manage streaming of video, and a game management server configured to manage progress of a game, wherein the user device is provided with: first output control processing circuitry configured to display a screen of the game played by a user on a display unit, first transmission processing circuitry configured to transmit data for streaming a video of the game to the stream management server, operation accepting processing circuitry configured to accept an operation of the user to view an object acquired in the game, and second output processing circuitry configured to display an object display screen including the object acquired in the game and streaming conditions of the video acquired from the stream management server in response to accepting the operation of the user, the stream management server is configured to transmit data for streaming the video to watching user devices and record streaming conditions of the video, and the game management server is configured to determine whether a playing status of the user for the game meets an acquisition condition for the object and record the object and the user in association with each other in response to the acquisition condition being met.

(56) The information processing system according to (55), wherein the game is a multiplayer game that can be played by a plurality of users simultaneously, and the second output control processing circuitry is configured to display information relating to the plurality of users in the multiplayer game on the object display screen as the streaming conditions.

(57) The information processing system according to (55) to (56), further comprising acquisition processing circuitry configured to receive data for displaying a received video of the game streamed from the stream management server, wherein the second output control processing circuitry is configured to configure the object display screen to be displayable only while displaying the received video.

(58) The information processing system according to (55) to (57), further comprising acquisition processing circuitry configured to receive data for displaying a received video of the game streamed from the stream management server, wherein the second output control processing circuitry is configured to configure the object display screen to be displayable during a period other than a watching period in which the received video is displayed.

(59) The information processing system according to (55) to (58), wherein the game is a multiplayer game that can be played by a plurality of users simultaneously and in which a game field is respectively associated with each of the plurality of users, further comprising: second transmission processing circuitry configured to transmit game progress data based on the operation of a first user, who is a user using the user device, to the game management server for managing progress of the game, wherein the first output control processing circuitry is configured to progress the game in a game field associated with a second user different from the first user among the plurality of users, and the second output control processing circuitry is configured to display the object display screen of the acquired object when the first user meets an acquisition condition of the object, regardless of whether the game field associated with the second user is associated with the first user.

(60) An information processing apparatus comprising first output control processing circuitry configured to display a screen of the game played by a user on a display unit, first transmission processing circuitry configured to transmit data for streaming a video of the game to a stream management server, operation accepting processing circuitry configured to accept an operation of the user to view an object acquired in the game, and second output processing circuitry configured to display an object display screen including the object acquired in the game and streaming conditions of the video acquired from the stream management server in response to accepting the operation of the user.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the embodiments, as well as other claims. The disclosure, including any readily discernible variants of the teachings herein, defines, in part, the scope of the foregoing claim terminology such that no inventive subject matter is dedicated to the public.

The invention claimed is:

1. A non-transitory computer-readable storage medium for storing a program including computer-readable instructions that, when executed by one or a plurality of computers, cause the one or the plurality of computers to perform a method, the method comprising:

displaying a screen of a game played by a user on a display unit;

transmitting data for real-time streaming a video of the game to a stream management server for managing real-time streaming;

accepting an operation of the user to view an object acquired in the game; and displaying an object display screen including the object acquired by the user and streaming conditions of the video acquired from the stream management server in response to accepting the operation of the user.

2. The non-transitory computer-readable storage medium according to claim 1, wherein displaying the object display screen includes displaying information relating to other users associated with devices receiving the data for streaming the video of the game on the object display screen as the streaming conditions.

3. The non-transitory computer-readable storage medium according to claim 1, wherein displaying the object display screen includes displaying conditions from when the user played the game on the object display screen as the streaming conditions.

4. The non-transitory computer-readable storage medium according to claim 1, wherein displaying the object display screen includes displaying a viewable group chat including other users associated with devices receiving the data for streaming the video of the game on the object display screen as the streaming conditions.

5. The non-transitory computer-readable storage medium according to claim 1, wherein the game is a multiplayer game that can be played by a plurality of users simultaneously, and displaying the object display screen includes displaying information relating to the plurality of users in the multiplayer game on the object display screen as the streaming conditions.

6. The non-transitory computer-readable storage medium according to claim 1, the method further comprising receiving data for displaying a received video of the game streamed from the stream management server; and configuring the object display screen to be displayable only while displaying the received video.

7. The non-transitory computer-readable storage medium according to claim 1, the method further comprising receiving data for displaying a received video of the game streamed from the stream management server; and configuring the object display screen to be displayable during a period other than a watching period in which the received video is displayed.

8. The non-transitory computer-readable storage medium according to claim 1, wherein the game is a multiplayer game that can be played by a plurality of users simultaneously and in which a game field is respectively associated with each of the plurality of users, the method further comprising:

transmitting game progress data based on an operation of a first user, who is a user using a user device, to the game management server for managing progress of the game;

progressing the game in a game field associated with a second user different from the first user among the plurality of users; and displaying the object display screen of the acquired object based on an acquisition condition of the object, regardless of whether the game field associated with the second user is associated with the first user.

9. The non-transitory computer-readable storage medium according to claim 1, the method further comprising enabling display of a screen of the associated game field in response to a list of objects acquired in a game field associated with the user meeting prescribed conditions; and displaying the object display screen including the objects acquired by the first user in the associated game field.

10. The non-transitory computer-readable storage medium according to claim 1, the method further comprising enabling display of a screen of a newly associated game field to the user in response to a level associated with the user meeting prescribed conditions; and displaying the object display screen including objects acquired by the user in the newly associated game field.

11. An information processing method, the method comprising:

displaying, via first output control processing circuitry, a screen of a game played by a user on a display unit;

transmitting, via first transmission processing circuitry, data for real-time streaming a video of the game to a stream management server for managing real-time streaming;

accepting, via operation accepting processing circuitry, an operation of the user to view an object acquired in the game; and displaying, via second output control processing circuitry, an object display screen including the object acquired by the user and streaming conditions of the video acquired from the stream management server in response to accepting the operation of the user.

12. The information processing method according to claim 11, wherein the game is a multiplayer game that can be played by a plurality of users simultaneously, and the method further comprises displaying the object display screen includes displaying information relating to the plurality of users in the multiplayer game on the object display screen as the streaming conditions.

13. The information processing method according to claim 11, further comprising receiving, via acquisition processing circuitry, data for displaying a received video of the game streamed from the stream management server; and configuring, via the second output control processing circuitry, the object display screen to be displayable only while displaying the received video.

14. The information processing method according to claim 11, further comprising receiving data for displaying a received video of the game streamed from the stream management server; and configuring, via the second output control processing circuitry, the object display screen to be displayable during a period other than a watching period in which the received video is displayed.

15. The information processing method according to claim 11, wherein the game is a multiplayer game that can be played by a plurality of users simultaneously and in which a game field is respectively associated with each of the plurality of users, the information processing method further comprising:

transmitting, via second transmission processing circuitry, game progress data based on an operation of a first user, who is a user using a user device, to a game management server for managing progress of the game;

progressing, via the first output control processing circuitry, the game in a game field associated with a second user different from the first user among the plurality of users; and displaying, via the second output control processing circuitry, the object display screen of the acquired object based on an acquisition condition of the object, regardless of whether the game field associated with the second user is associated with the first user.

16. An information processing system comprising:

a user device, a stream management server configured to manage real-time streaming of video, and a game management server configured to manage progress of a game, wherein the user device is provided with:

first output control processing circuitry configured to display a screen of the game played by a user on a display unit, first transmission processing circuitry configured to transmit data for real-time streaming a video of the game to the stream management server, operation accepting processing circuitry configured to accept an operation of the user to view an object acquired in the game, and second output processing circuitry configured to display an object display screen including the object acquired in the game and streaming conditions of the video acquired from the stream management server in response to accepting the operation of the user, the stream management server is configured to transmit data for real-time streaming the video to watching user devices and record streaming conditions of the video, and the game management server is configured to determine whether a playing status of the user for the game meets an acquisition condition for the object and record the object and the user in association with each other in response to the acquisition condition being met.

17. The information processing system according to claim 16, wherein the game is a multiplayer game that can be played by a plurality of users simultaneously, and the second output control processing circuitry is configured to display information relating to the plurality of users in the multiplayer game on the object display screen as the streaming conditions.

18. The information processing system according to claim 16, further comprising acquisition processing circuitry configured to receive data for displaying a received video of the game streamed from the stream management server, wherein the second output control processing circuitry is configured to configure the object display screen to be displayable only while displaying the received video.

19. The information processing system according to claim 16, further comprising acquisition processing circuitry configured to receive data for displaying a received video of the game streamed from the stream management server, wherein the second output control processing circuitry is configured to configure the object display screen to be displayable during a period other than a watching period in which the received video is displayed.

20. The information processing system according to claim 16, wherein the game is a multiplayer game that can be played by a plurality of users simultaneously and in which a game field is respectively associated with each of the plurality of users, further comprising:

second transmission processing circuitry configured to transmit game progress data based on the operation of a first user, who is a user using the user device, to the game management server for managing progress of the game, wherein the first output control processing circuitry is configured to progress the game in a game field associated with a second user different from the first user among the plurality of users, and the second output control processing circuitry is configured to display the object display screen of the acquired object when the first user meets an acquisition condition of the object, regardless of whether the game field associated with the second user is associated with the first user.

21. An information processing apparatus comprising:

first output control processing circuitry configured to display a screen of the game played by a user on a display unit, first transmission processing circuitry configured to transmit data for real-time streaming a video of the game to a stream management server, operation accepting processing circuitry configured to accept an operation of the user to view an object acquired in the game, and second output processing circuitry configured to display an object display screen including the object acquired in the game and streaming conditions of the video acquired from the stream management server in response to accepting the operation of the user.

* * * * *